(12) United States Patent
Herskovitz

(10) Patent No.: US 7,896,243 B2
(45) Date of Patent: Mar. 1, 2011

(54) SELF-SERVICE AUTONOMOUS MERCHANDISING MACHINE

(76) Inventor: Michael Herskovitz, Philadelphia, PA (US)

( * ) Notice: Subject to any disclaimer, the term of this patent is extended or adjusted under 35 U.S.C. 154(b) by 941 days.

(21) Appl. No.: 11/800,211

(22) Filed: May 4, 2007

(65) Prior Publication Data

US 2007/0284442 A1 Dec. 13, 2007

Related U.S. Application Data

(60) Provisional application No. 60/811,697, filed on Jun. 7, 2006.

(51) Int. Cl.
*G06K 15/00* (2006.01)
(52) U.S. Cl. ...................................................... 235/383
(58) Field of Classification Search .................. 235/381, 235/383; 700/216
See application file for complete search history.

(56) References Cited

U.S. PATENT DOCUMENTS

| | | | | |
|---|---|---|---|---|
| 5,271,703 A | * | 12/1993 | Lindqvist et al. | 414/268 |
| 5,636,966 A | * | 6/1997 | Lyon et al. | 414/791.6 |
| 6,505,093 B1 | * | 1/2003 | Thatcher et al. | 700/216 |
| 6,979,032 B2 | | 12/2005 | Damhuis | |
| 7,021,491 B2 | | 4/2006 | Sloss et al. | |
| 7,624,769 B2 | * | 12/2009 | Bartholomew et al. | 141/2 |
| 2001/0002448 A1 | * | 5/2001 | Wilson et al. | 700/233 |
| 2002/0095238 A1 | * | 7/2002 | Ahlin et al. | 700/243 |
| 2003/0136794 A1 | * | 7/2003 | Chirnomas | 221/123 |
| 2004/0026441 A1 | * | 2/2004 | Chirnomas | 221/92 |
| 2008/0201241 A1 | * | 8/2008 | Pecoraro | 705/27 |

* cited by examiner

*Primary Examiner* — Daniel A Hess
(74) *Attorney, Agent, or Firm* — Stradley Ronon Stevens & Young, LLP

(57) ABSTRACT

A solution for consumer self-service merchandise order placement, payment, and pick up, integrated with a merchant's Internet e-commerce site and with an effective merchant point-of-sale management system. The solution includes a system and apparatus and of a set of specific business methods. A self-service merchandising machine for un-attended, autonomous, and automatic dispensing of retail products includes an input/output subsystem; a control subsystem having and being based upon a computer; a specially configured storage subsystem; a unique pick-and-place robotic-based product retrieval subsystem with an adaptive material handling system; and a product extraction subsystem. A related method of using the machine includes the steps of enabling self-service retail sale; permitting Internet sale with local merchandise pick-up; managing the business operations of the system; replenishing inventory using Kanban methods; restocking inventory; operating and monitoring a security camera; handling Category I error; and handling Category II error.

38 Claims, 17 Drawing Sheets

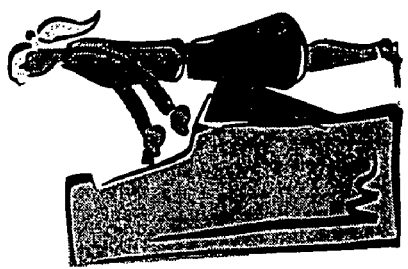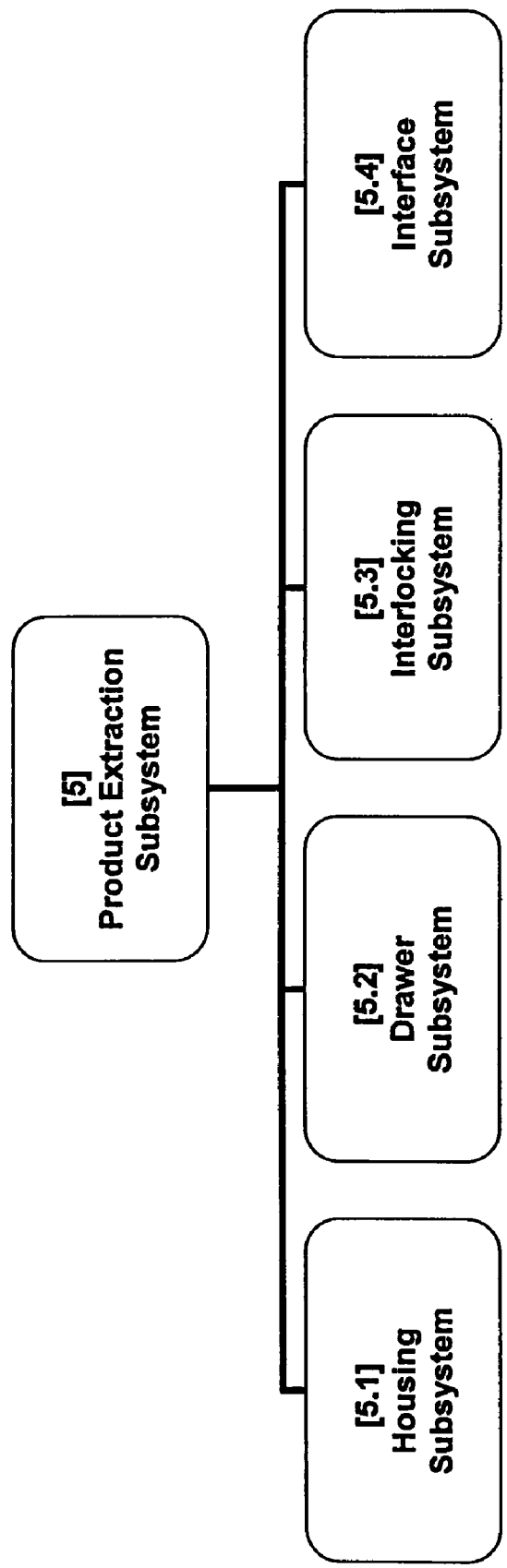
FIG. 1F

SELF-SERVICE AUTONOMOUS MERCHANDISING MACHINE

RELATED APPLICATION

This application claims the benefit of priority to U.S. Provisional Patent Application Ser. No. 60/811,697 filed on Jun. 7, 2006, the contents of which are incorporated in this application by reference.

TECHNICAL FIELD

The present invention relates generally to systems and methods of doing business and, more particularly, to self-service retail merchandising and sale.

BACKGROUND OF THE INVENTION

Self-service merchandising machines are known and can be recognized in their most common embodiment as vending machines. Vending machines enable a paying customer to review available product choices, make a selection, deposit a form of payment and, in return, receive the selected product. One drawback of vending machines is, however, that they typically offer a limited selection of merchandise.

Automated bank teller machines are known and can be recognized in their most common embodiment as the Automated Teller Machine ("ATM"). ATM's are deployed either integral to a bank or other retail establishment, or as a stand-alone kiosk. ATM's allow the consumer to complete a wide range of bank-related transactions by processing credit cards, debit cards, store-issued cards, smart cards, radio frequency identification (RFID) cards, and the like.

Robotic pick-and-place machines are known and can be recognized in their most common embodiment as factory automation machines and precision semiconductor assembly machines. Robotic pick-and-place machines offer varied degrees of speed, precision, repeatability, and reach, and are in common use in semiconductor fabrication factories.

Retail store operators in general, and drug store and convenience store operators in particular, have long recognized the consumer market's need for speed, convenience of self-service, and longer operating hours. Many stores are open for business 12-16 hours per day; some even operate around the clock and are open 24 hours per day. Such longer operations cause the owner of the store, however, to incur significant incremental overhead costs for labor, insurance, utilities, security, and other business-related items.

There exists a need to integrate the technologies and associated benefits offered by vending machines and ATM machines with technologies and benefits offered by pick-and-place robotic machines in such a manner as to enable retail operators to offer their customers a large and diverse product selection similar to the selection available within the retail store itself for fast self-service at all hours of the day and night, but without incurring the incremental costs associated with 24 hours per day store operation.

Internet e-commerce is commonplace today, made possible by specific merchants (e.g., Sears), by large distributors (e.g., Amazon), and by specialty sites (e.g., eBay). These e-commerce sites require the consumer to wait, however, for the products to be delivered via third-party shippers. There exists a need to enable the customer to transact e-commerce at the convenience of the customer's home or office, but to be able to pick up the merchandise at a near-by location at their convenience without having to wait for third-party delivery.

To meet this need and to overcome the shortcomings of existing vending technologies, a new, automated, self-service retail merchandising and sale system and method are provided. An object of the present invention is to provide an automated, self-service system at which a customer may purchase, pay for, and receive one or more products from a very large selection of product offerings. Another object is to provide an automated, self-service system that may be installed as an integral part of an existing retail store in such a manner that a customer may purchase products without having to enter the store. A related object is to provide an automated, self-service system that may be installed in a stand-alone, fully enclosed kiosk inside a shopping mall or other high-traffic and secure location at which a customer may purchase one or more products without having to enter the kiosk and without having a need for the assistance of a retail clerk.

It is still another object of the present invention to provide an automated, self-service system that customers can access using the Internet for the purposes of determining available inventory, placing orders, purchasing and paying for merchandise, and subsequently picking up purchased merchandise at a specified location of the system. An additional object is to provide a system that records information concerning all purchases performed at the system and makes the information available to the merchant for a wide range of value-add business analyses, such as market and business analytics, inventory replenishment and management, and cross selling—among others. Yet another object of this invention is to provide a system that provides authorized personnel with interactive access for the purpose of inquiries concerning system status, system operation, transactions performed, and inventory management. It is a further object of an exemplary form of the present invention to provide an automated system that provides remote access to authorized personnel allowing them to inquire concerning system status, review security camera imagery, monitor system operations, review transactions performed, inspect remaining inventory, and replenish on-hand inventory.

SUMMARY OF THE INVENTION

To achieve these and other objects, and in view of its purposes, the present invention provides a system for and a method of managed, self-service, retail merchandising and sale.

The system includes an Input/Output (I/O) Subsystem [1], a Control Subsystem [2], a Storage Subsystem [3], a Product Retrieval Subsystem [4], and a Product Extraction Subsystem [5]. More detailed description of each subsystem is provided elsewhere in this application.

The method includes one or more of the following integrated and interactive steps: displaying to the customer the available product selection [a]; accepting the customer's selection of one or more products from the computer-generated and displayed electronic catalog of available products (e-catalog) [b]; providing to the customer the mechanism by which to submit payment for the products [c], and upon successful processing of the payment (e-commerce); providing to the customer the selected products [d]; and providing the system operator (e.g., merchant, retail store owner, etc.) with an efficient and practical mechanism for managing, controlling, and operating the self-service merchandising and sale system [e].

One exemplary form of the present invention structurally integrates the system into an existing structure (e.g., retail establishment, mall, prison commissary, athletic field, airport terminal, drug store, etc.) in a manner that enables customers to accomplish self-service operation. Another exemplary form of the invention deploys the system in a stand-alone, kiosk-like structure.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 1F is a schematic diagram illustrating an exemplary embodiment of a Product Extraction Subsystem;

DETAILED DESCRIPTION OF THE INVENTION

Figure 1A:
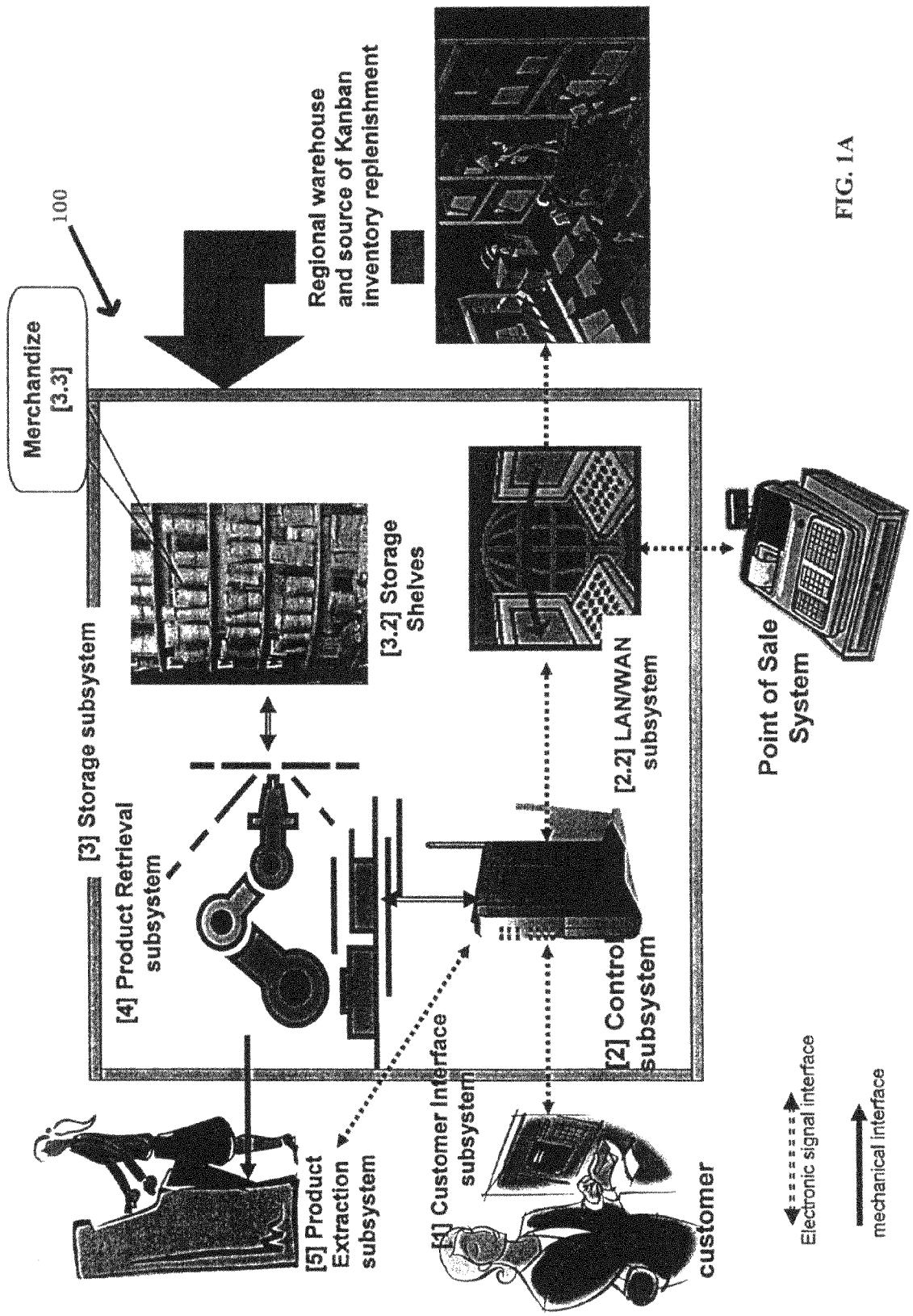
FIG. 1A is a schematic diagram illustrating an exemplary embodiment of the present invention having five Subsystems, namely an Input/Output (I/O) Subsystem, a Control Subsystem, a Storage Subsystem, a Product Retrieval Subsystem, and a Product Extraction Subsystem.

Referring now to the drawing, in which like reference numbers refer to like elements throughout the various figures that comprise the drawing, FIG. 1A shows schematically an exemplary embodiment of a system [100] of the present invention.

System Overview

As illustrated in FIG. 1A, the embodiment has a number of Subsystems including: an Input/Output (I/O) Subsystem [1], a Control Subsystem [2], a Storage Subsystem [3], a Product Retrieval Subsystem [4], and a Product Extraction Subsystem [5]. By way of an example, each of these Subsystems may consist further of operatively integrated Subsystems, such as those described below.

[1] The Input/Output (I/O) Subsystem

Figure 1B:
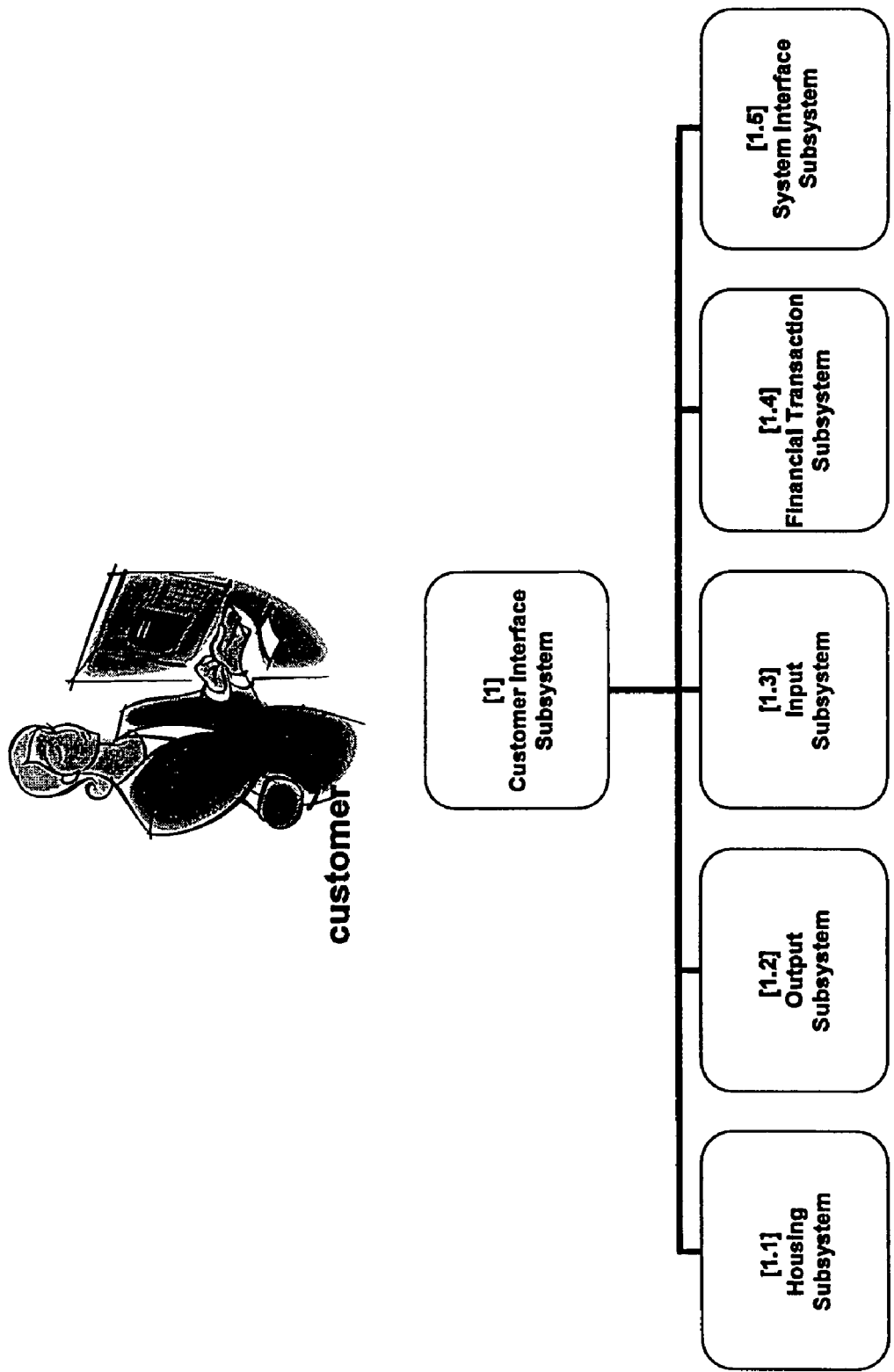
FIG. 1B is a schematic diagram illustrating an exemplary embodiment of an Input/Output (I/O) Subsystem.

The Input/Output (I/O) Subsystem [1] includes one or more operatively integrated Subsystems, such as those depicted in FIG. 1B. Such Subsystems include a housing Subsystem [1.1]; an output Subsystem [1.2]; an input Subsystem [1.3]; a financial transaction Subsystem [1.4]; and a system interface Subsystem [1.5].

The housing Subsystem [1.1] provides the physical structure to securely hold Subsystems [1.2] through [1.5] as well as to provide a secure physical interconnect with the storage Subsystem [3] and/or the retail store structure and/or the stand-alone structure of a kiosk. The output Subsystem [1.2] contains a Graphical User Interface (GUI) display screen; a receipt printer; an audible sound generator; a speaker; and a standard printer to output product information/fact sheets. The input Subsystem [1.3] contains keypad and/or function keys; a GUI touch-screen; a payment card (e.g., credit, debit, store, and the like) input slot and card processing Subsystem; and a microphone. The financial transaction Subsystem [1.4] contains hardware and software necessary to accept, recognize, communicate, and process payments from payment cards accepted by the general retail industry, including cards employing magnetic strip technology, RFID technology, optical technology, embedded chip technology, and the like. The system interface Subsystem [1.5] contains hardware and software to facilitate electronically sharing information between the Input/Output (I/O) Subsystem [1] and the control Subsystem [2].

The input Subsystem [1.3] of the I/O Subsystem [1] communicates with the computer [2.1] to cause a database [2.4] to present to the customer on the output Subsystem [1.2] pertinent information to enable the customer to use the input Subsystem [1.3] to select specific products available in a storage closet [3.1] for purchase. Examples of pertinent information may include product name, description of product, purchase price, discount information, tax information, and/or image of the product. Alternate embodiments may also include display and/or print-out of a consumer information fact-sheet for the product.

[2] The Control Subsystem

Figure 1C:
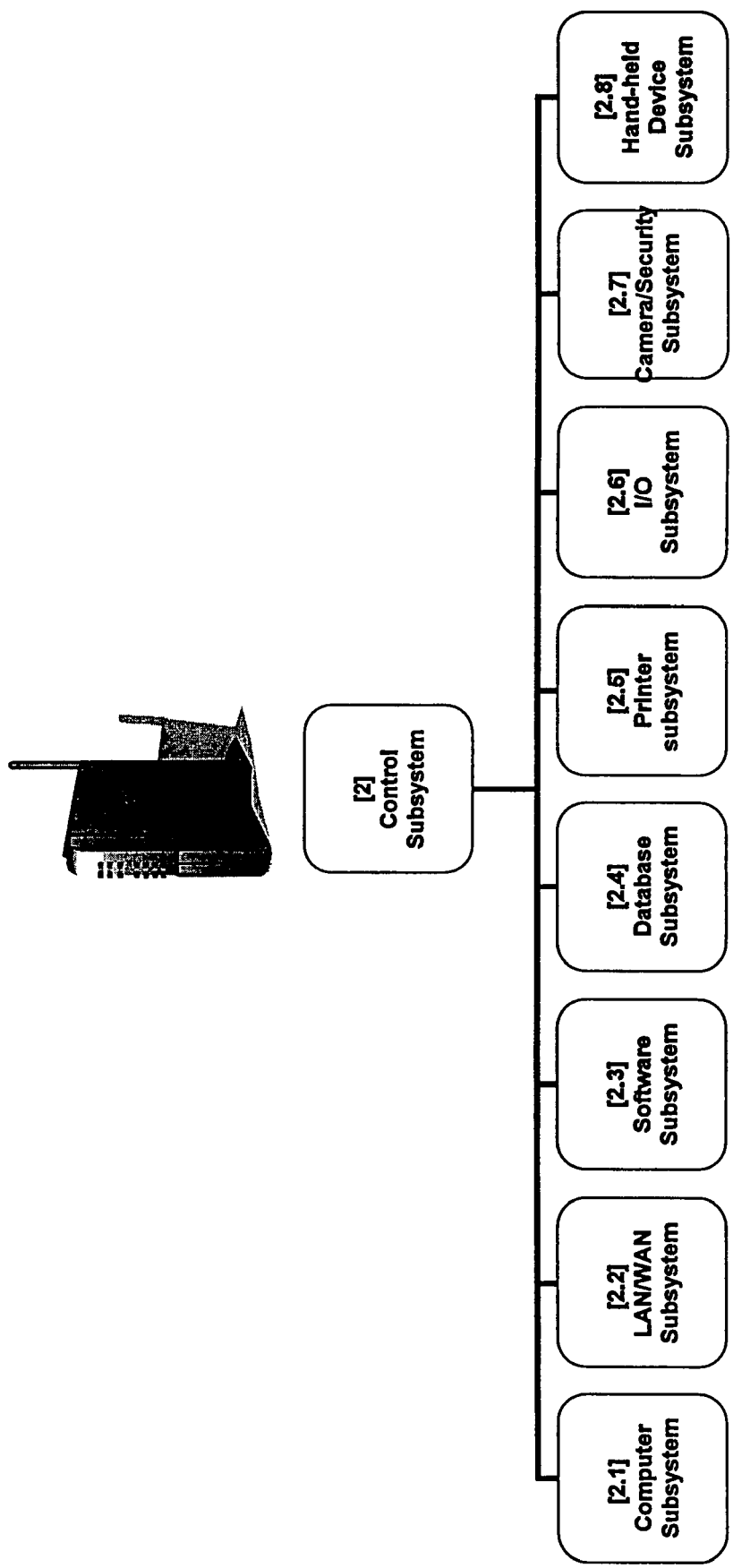
FIG. 1C is a schematic diagram illustrating an exemplary embodiment of a Control Subsystem.

The control Subsystem [2] includes one or more operatively integrated Subsystems, such as those depicted in FIG. 1C. Such Subsystems include at least one computer [2.1]; a Local Area Network (LAN) and Wide Area Network (WAN) system interface [2.2]; specially developed software programs [2.3]; a merchandise database [2.4]; a printer [2.5]; an Input/Output (I/O) Subsystem [2.6]; an interior/exterior security camera Subsystem [2.7], and a hand-held device [2.8].

The computer [2.1] performs standard computer operations, including governance of internal operations, initiation and control of external communication via LAN or WAN protocol and connectivity, and the execution of all installed software programs. The computer [2.1] is in operative connection with the LAN/WAN [2.2], the printer [2.5], the I/O Subsystem [2.6], the camera Subsystem [2.7], and the hand-held device [2.8], as well as the storage Subsystem [3], the product retrieval Subsystem [4], and the product extraction Subsystem [5]. The computer [2.1] performs command and control of the system [100] and its operations in accordance with the programmed instructions of the software programs [2.3] and the information contained in the merchandise database [2.4].

The LAN/WAN system interface [2.2] achieves bi-directional, intra-system communication as well as external communication with other computers, such as the store's point-of-sale system and/or the store's designated Internet gateway computer, using wired, optical, and/or broadband technology using TCP/IP or other recognized secure communication protocols. The LAN/WAN system interface [2.2] facilitates electronically sharing information between the computer [2.1] and one or more remote computers. Such remote computers may include, for example, a computer at a financial institution that operates systems that authorize and record information concerning financial transactions conducted by customers using the input Subsystem [1.3]; a back-office computer that allows the retail operator to monitor, gather data, manage, and command the system [100], a point-of-sale system, and/or an inventory management system; and other computers.

The software programs [2.3] consist of specially written programs designed to accomplish all stated objectives of the invention. When executed by the computer [2.1], the software programs [2.3] provide overall management and control of the system of the present invention.

The merchandise database [2.4] contains information (e.g., relevant descriptive information, pricing information, descriptive images, etc.) about the merchandise available for purchase and, in doing so, enables a full functionality e-catalog.

The printer [2.5] allows the system operator to obtain printouts of data and/or charts from the computer [2.1].

The I/O Subsystem [2.6] is operatively connected with the computer [2.1] to permit users to interact with the computer [2.1] and may include a keyboard, mouse, GUI screen, touch screen, sound, voice recognition, and other conventional components.

The interior/exterior security camera Subsystem [2.7] collects digital color high-resolution images that are recorded within the computer [2.1] to further enable a remote authorized and authenticated user to monitor the interior and exterior of the storage Subsystem [3] in real time and in time-late modes.

The hand-held device [2.8] is a Subsystem that reads and recognizes the on-shelf position location identification [3.5]; reads and recognizes bar codes, RFID tags, and similar components affixed to individual merchandise items [3.3]; and establishes and maintains operative communication link with the computer [2.1] through which the two Subsystems exchange commands and information.

The customer may indirectly access the control Subsystem [2] via the Internet web site of the merchant and the LAN/WAN Subsystem [2.2] using a secure/encrypted mechanism in order to place an order for pick-up within 60 minutes. Incidentally, the time delay of 60 minutes is used as an example only and different times, ranging from zero to hours, may be configured by the merchant to be most consistent— with and most responsive—to the local market and customer behavior. The customer accesses the merchant's Internet web site for the purpose of transacting product selection, purchase, and payment using conventional e-catalog (e.g., product selection and query) and e-commerce (e.g., making use of shopping cart functionality and making payments) methods. A server of the Internet web site exchanges product information and credit card identification information between the computer [2.1] and the on-line consumer.

[3] The Storage Subsystem

Figure 1D:
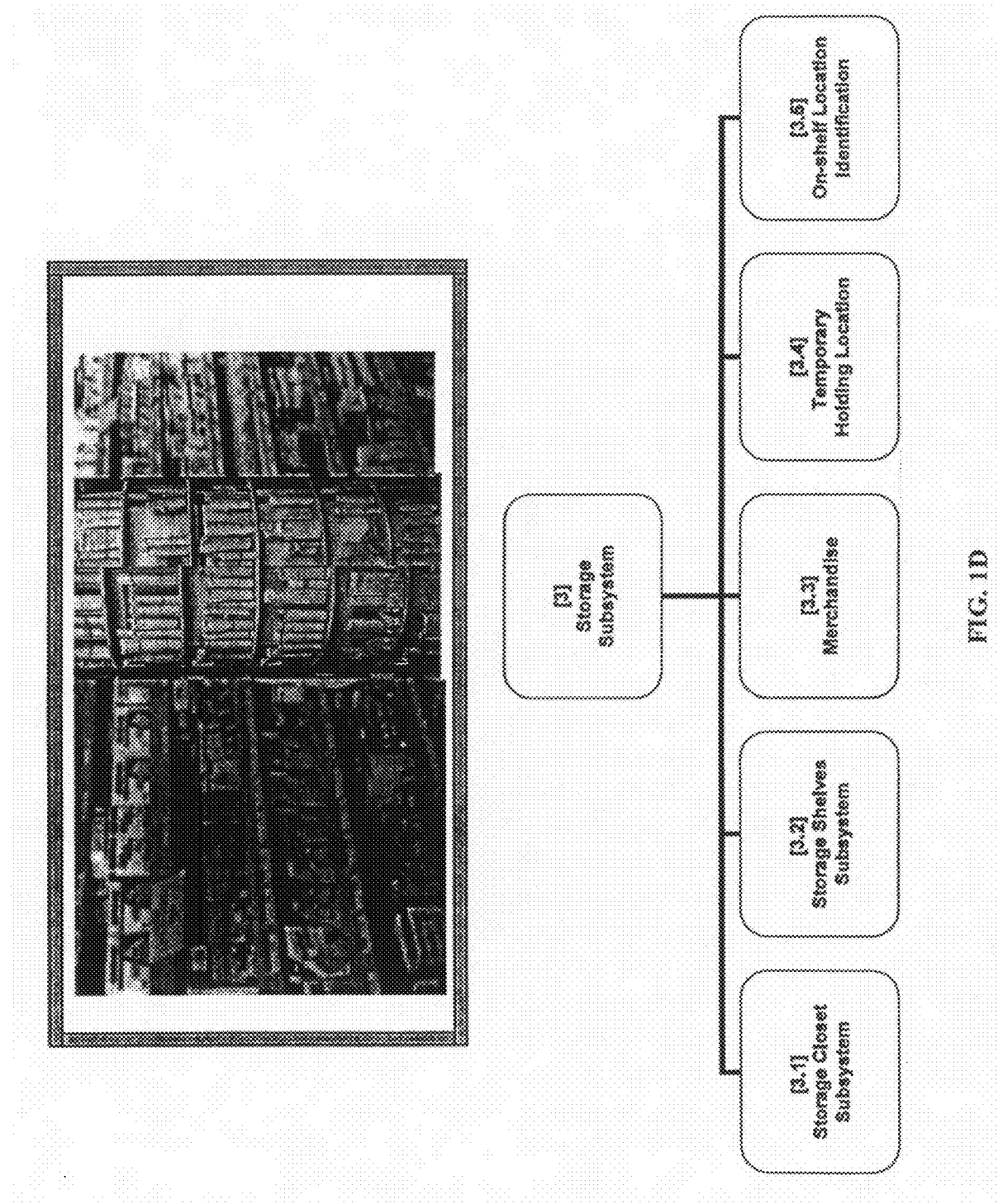
FIG. 1D is a schematic diagram illustrating an exemplary embodiment of a Storage Subsystem.

The storage Subsystem [3] includes one or more operatively integrated Subsystems, such as those depicted in FIG. 1D. Such Subsystems include a storage closet [3.1]; a plurality of storage shelves [3.2]; a multiplicity of retail merchandise items [3.3] of various shapes and sizes; a multiplicity of temporary holding locations [3.4]; and precise on-shelf position location identification [3.5].

The storage closet [3.1] is a structurally secure and alternatively configured closet within which the merchandise and the other Subsystems [1, 2, 4, 5] reside and operate. Access to the interior of the closet is via an integral locked door through which an authorized individual may enter to restock or reconfigure the storage shelves [3.2] and/or the merchandise items [3.3], and/or to perform scheduled and unscheduled maintenance and repairs to the product retrieval Subsystem [4] and/or to interact with the computer [2.1]. Incidentally, for the stand-alone kiosk embodiment of the present invention, the storage closet [3.1] walls may include safety glass windows or integral flat-screen television-like displays to allow the customer to view the robot's [4.1] operation as a form of entertainment and marketing attraction.

The storage shelves [3.2] comprise a multiplicity of shelves of various lengths and width arranged in parallel with the ground at a multiplicity of heights relative to the ground in a manner consistent with and supportive of rapid access by the material handling Subsystem [4.3].

The merchandise items [3.3] comprise a multiplicity of products (e.g., pre-packaged, over-the-counter medication; cold, flu, allergy, aches-and-pain management remedies; personal hygiene; first aid; baby health and food products; clothing articles; gift-ware; packaged food; etc.) arranged in a determined fashion and placed at a multiplicity of locations upon the storage shelves [3.2].

The temporary holding location [3.4] may be a designated storage shelf [3.2] and/or a specially configured and set-aside bin and/or any other suitable structure inside the storage closet [3.1]. The temporary holding location is located and configured for optimal performance during the storage of multiple products and the eventual removal of those products by the robot [4.1] for final deposit in the drawer [5.2] for the benefit of the customer (see Example 2 below).

The on-shelf position location identification [3.5] is a Subsystem that consists of a multiplicity of physical tags affixed to the individual shelves [3.2] in a plurality of locations to enable the hand-held device [2.8] to uniquely identify each location to the computer [2.1]. The tags may employ a range of known coordinate system identification technologies, such as RFID, bar code, optical reader, and the like.

[4] The Product Retrieval Subsystem

Figure 1E:
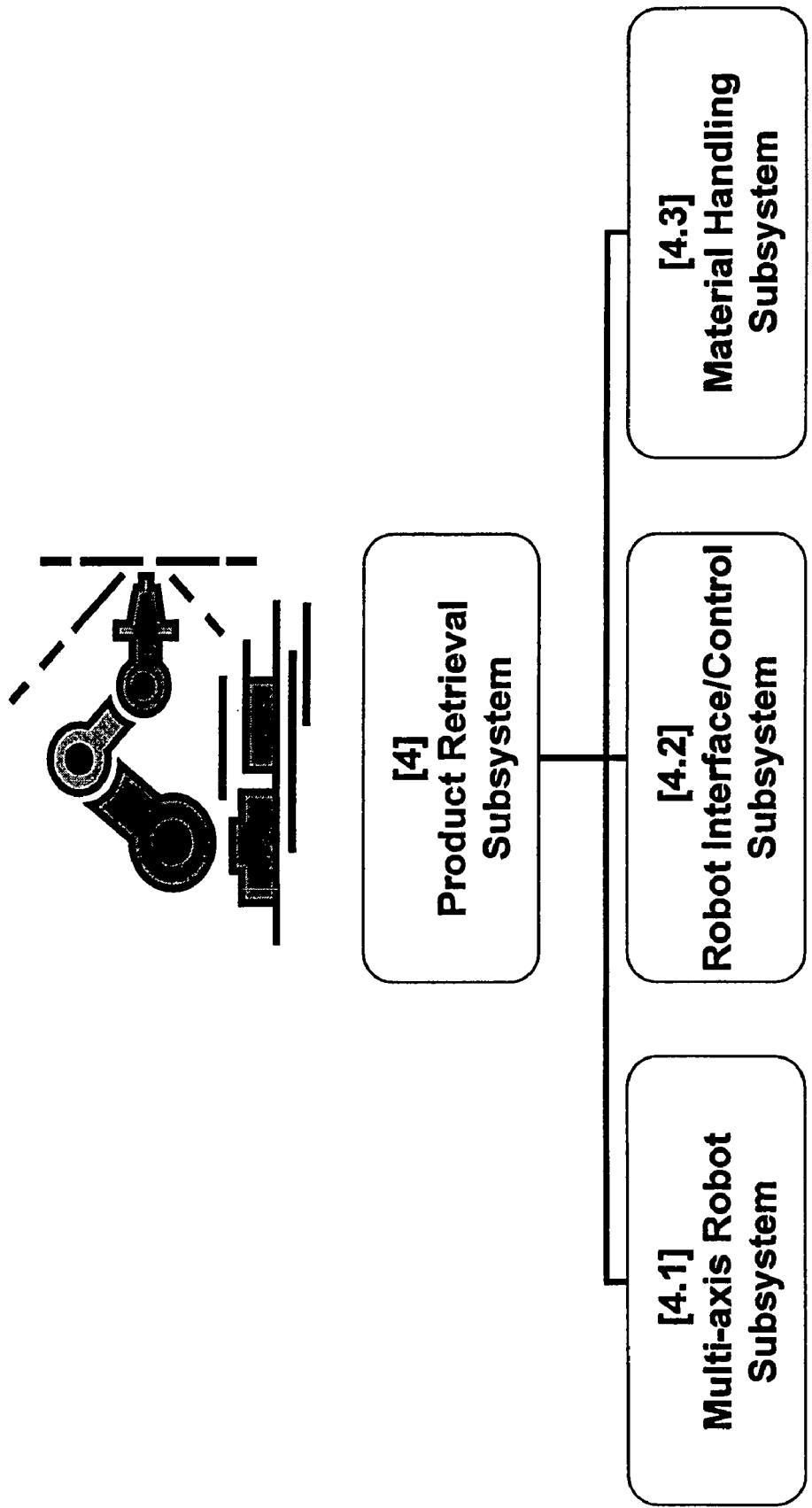
FIG. 1E is a schematic diagram illustrating an exemplary embodiment of a Product Retrieval Subsystem.

The product retrieval Subsystem [4] includes one or more operatively integrated Subsystems, such as those depicted in FIG. 1E. Such Subsystems include at least one multi-axis robot [4.1]; a robot interface control Subsystem [4.2]; and a material handling Subsystem [4.3].

The multi-axis robot [4.1] integrates robot design; a precision, three-dimensional, high-speed travel mechanism; and motion control technologies to enable the robot Subsystem to traverse in three-dimensional space within the confines of the storage closet [3.1] based on commands received from the computer [2.1] via the interface control Subsystem [4.2]. By means of example, the robot [4.1] may consist of multiplicity of robotic arms each with specially configured end-of-arm tool as the material handling system [4.3]; it may consist of an overhead gantry with vacuum-assist or mechanical grippers for pickup; it may consist of an integrated combination of moving shelves & multiplicity of robotic receptacle bins by which to transfer items from the shelves [3.2] to the drawer [5.2], etc.

The robot interface control Subsystem [4.2] facilitates bi-directional communication between the robot [4.1] and the computer [2.1], including receiving precise go-to coordinate information and precise item pick-up instructions to be further conveyed to the material handling Subsystem [4.3].

The material handling Subsystem [4.3] provides the electromechanical mechanism for precise and controlled pick of merchandise items [3.3] from the storage shelves [3.2] and subsequent placement of the merchandise in the temporary holding location [3.4] or the drawer [5.2].

The product retrieval Subsystem [4] is typically designed to handle a multiplicity of merchandise items [3.3] of various shapes and sizes, but generally not exceeding 300 cubic inches in volume and 1 pound in weight each. These limitations of 300 cubic inches and 1 pound are, however, for one exemplary implementation of the present invention. Alternate exemplary implementations of the invention can be achieved by using alternate and appropriately integrated implementations appropriately configured to support products that are larger in size and/or heavier in weight.

The aforementioned robot [4.1] is a generic exemplary implementation of the retrieval Subsystem [4] and may include: a multiple-degrees-of-freedom robotic arm with a specially-configured end-of-arm tool as the material handling Subsystem [4.3]; an overhead moving gantry with vacuum assist pickup (as disclosed, for example, in U.S. Pat. No. 7,021,491); an integrated combination of moving shelves with a moving or stationary robotic-assisted receptacle bin by which to transfer products from the shelves [3.2] to the extraction Subsystem [5].

[5] The Product Extraction Subsystem

The product extraction Subsystem [5] includes one or more operatively integrated Subsystems, such as those depicted in FIG. 1F. Such Subsystems include a housing [5.1]; a drawer [5.2]; an interlock [5.3]; and an interface [5.4].

The housing [5.1] Subsystem provides the physical structure to securely hold Subsystems [5.2] through [5.4] as well as to secure physical interconnection with the storage closet [3.1] and/or the retail store structure and/or the stand-alone structure of a kiosk.

The drawer [5.2] Subsystem consists of a suitably configured container that is hinged such that it may open into the interior of the storage closet [3.1] in order to receive items placed into it by the robot [4.1] and to the exterior towards the customer in order to enable the customer to manually extract the items purchased and located in the container.

The interlock [5.3] Subsystem consists of a sufficiently strong and tamper-proof electro-mechanical mechanism that prevents the unauthorized opening of the drawer [5.2].

The interface [5.4] Subsystem permits the computer [2.1] to command the interlock [5.3] to lock or unlock and the drawer [5.2] to rotate in the appropriate direction.

Business Method Overview

Figure 2:
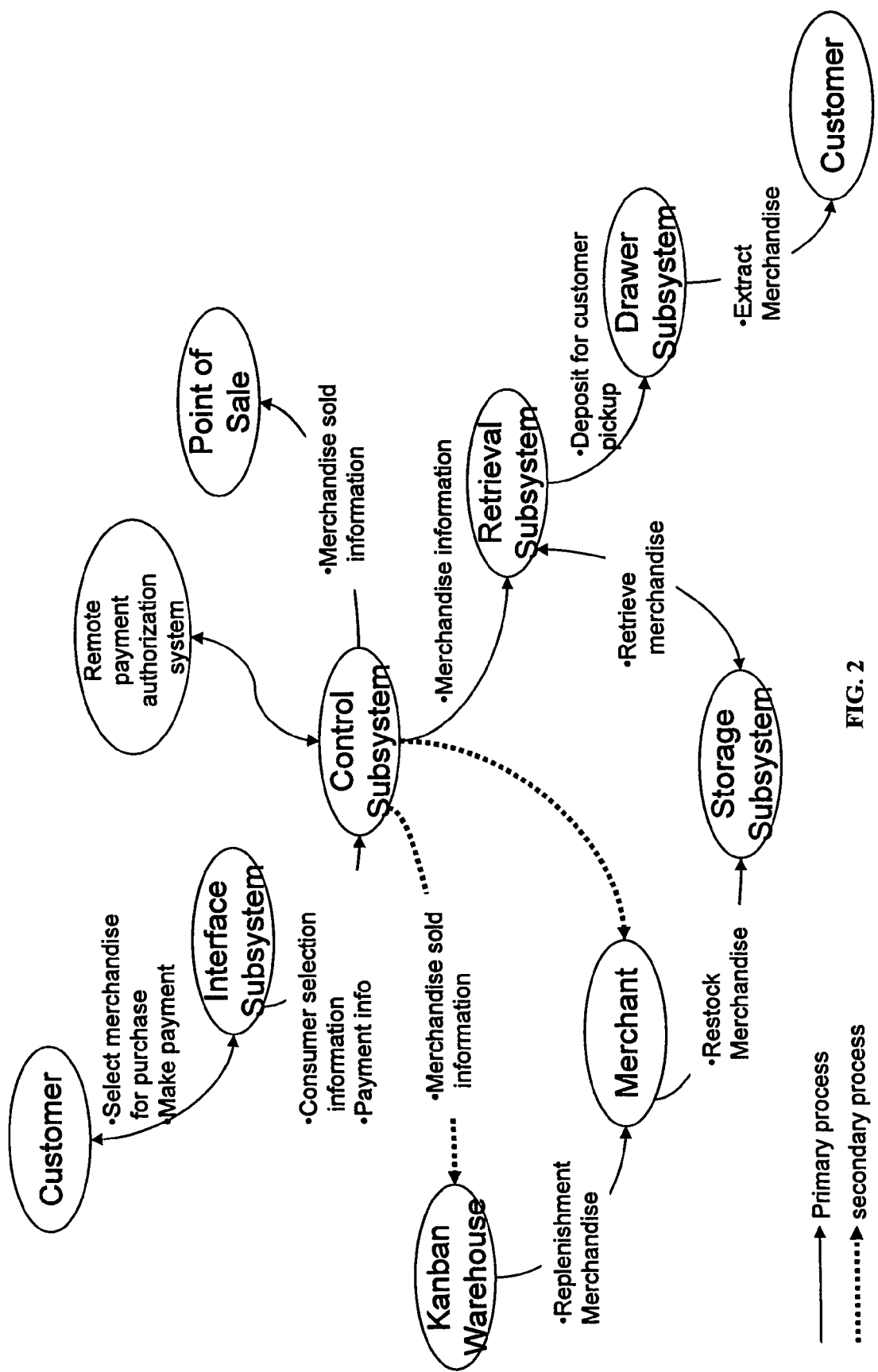
FIG. 2 illustrates an exemplary embodiment of a business workflow implemented using a system of the present invention, highlighting a retail operation business method.
Figure 3A:
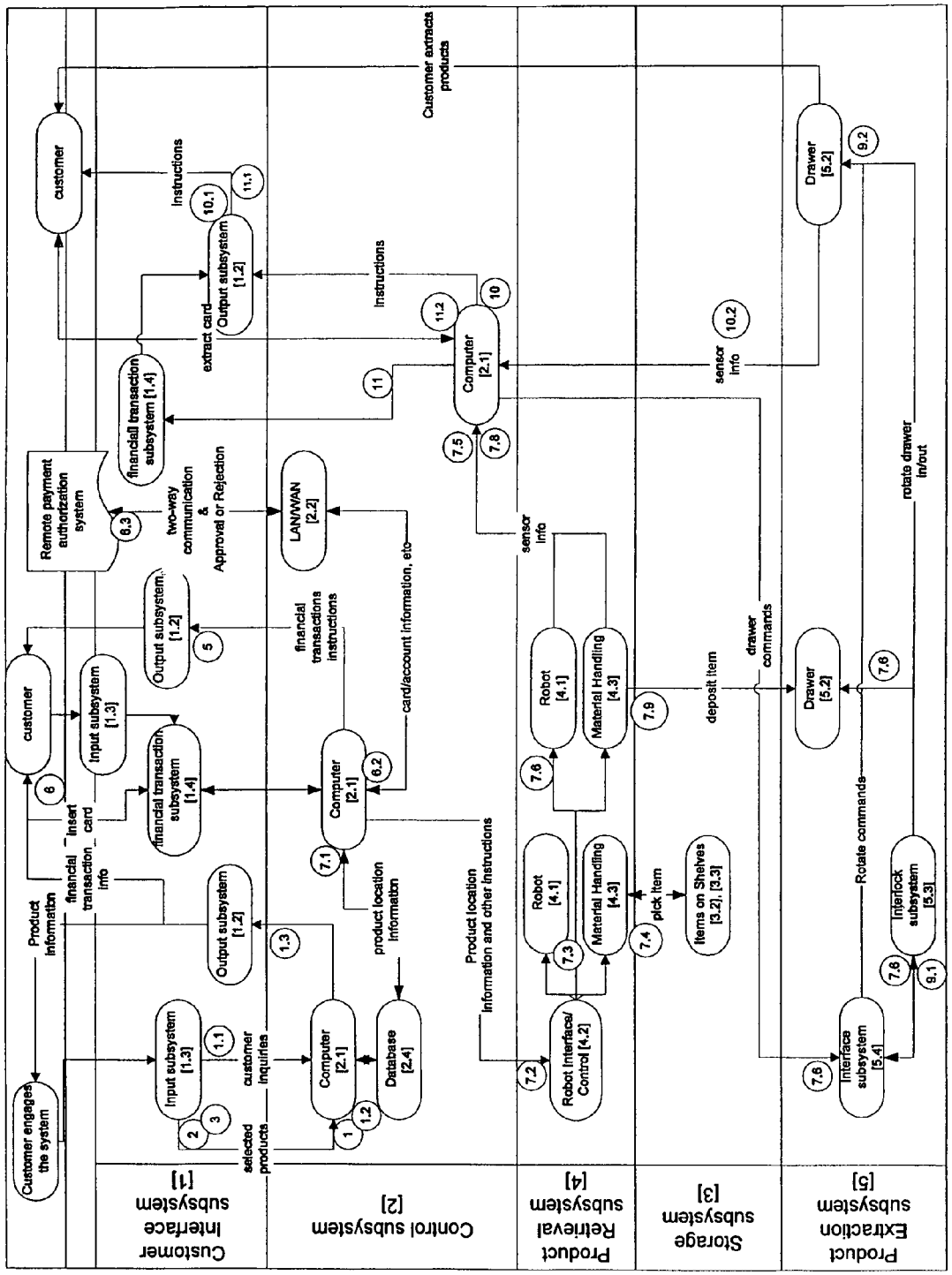
FIG. 3A illustrates the first part of an exemplary embodiment of a business workflow implemented using a system of the present invention, highlighting a business method for self-service retail purchase and sale conducted in person.
Figure 3B:
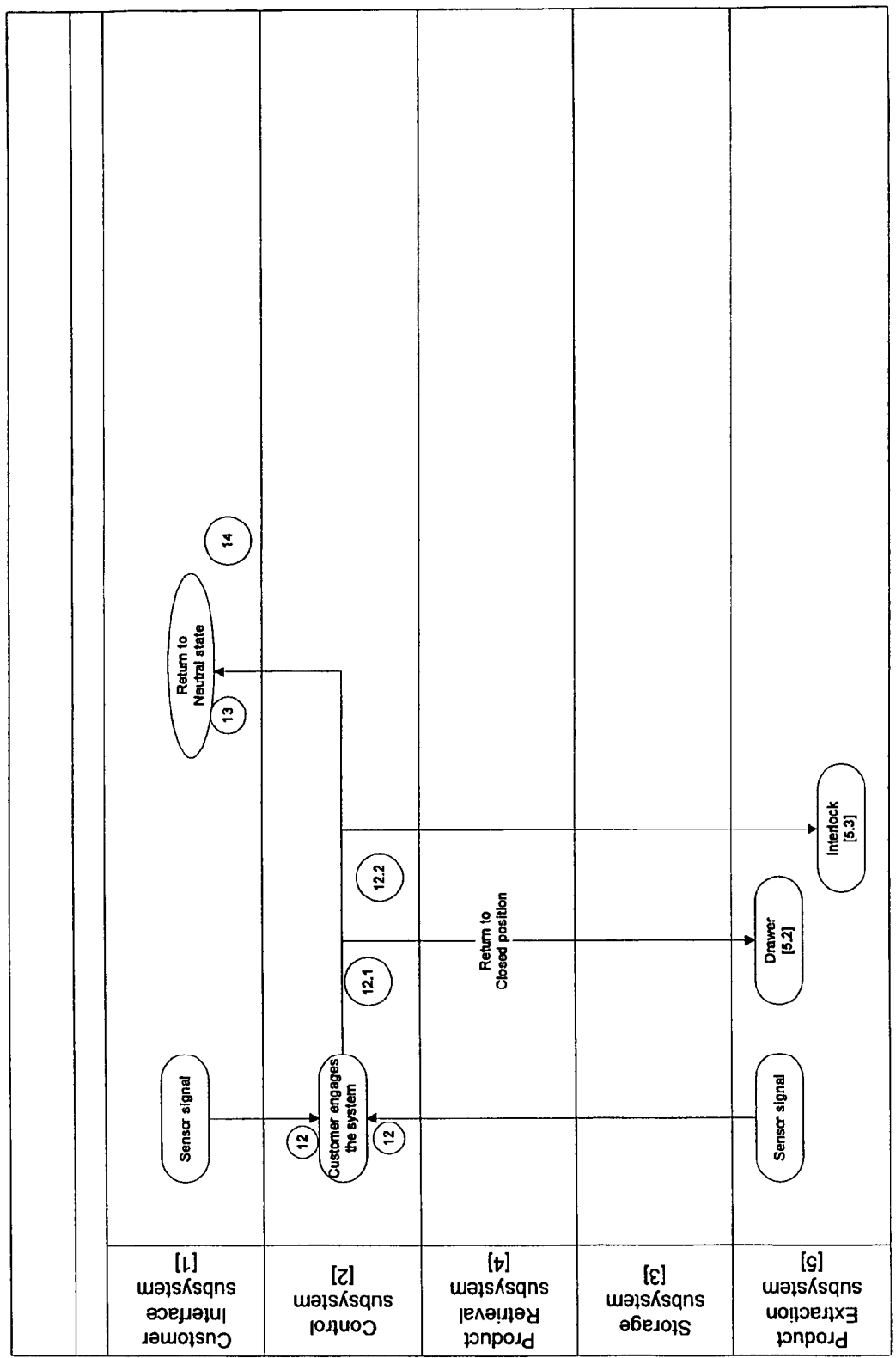
FIG. 3B illustrates the second part of the exemplary embodiment of the business workflow shown in FIG. 3A.
Figure 4:
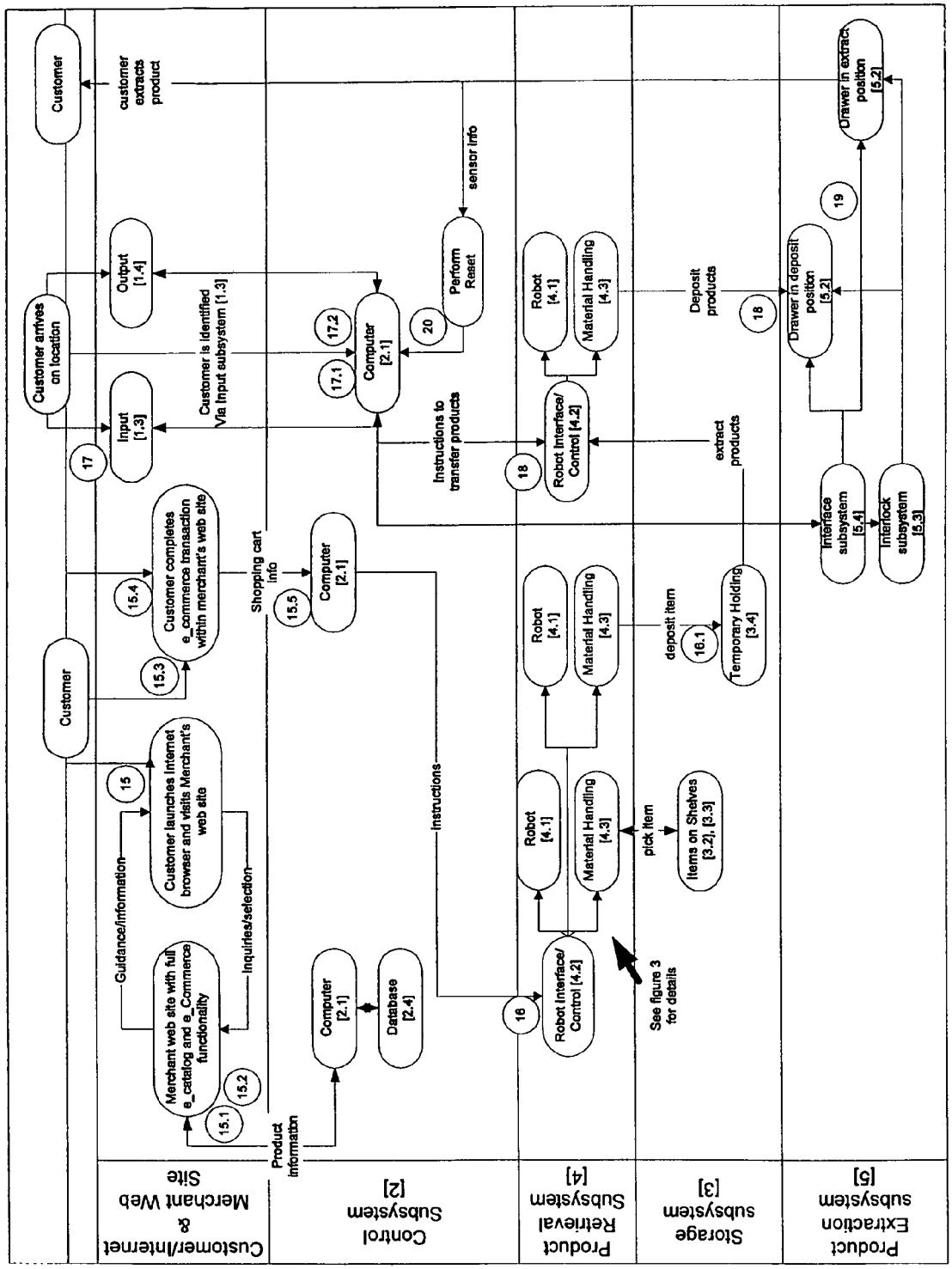
FIG. 4 illustrates an exemplary embodiment of a business workflow implemented using a system of the present invention, highlighting an Internet-enabled purchase and sale.
Figure 5:
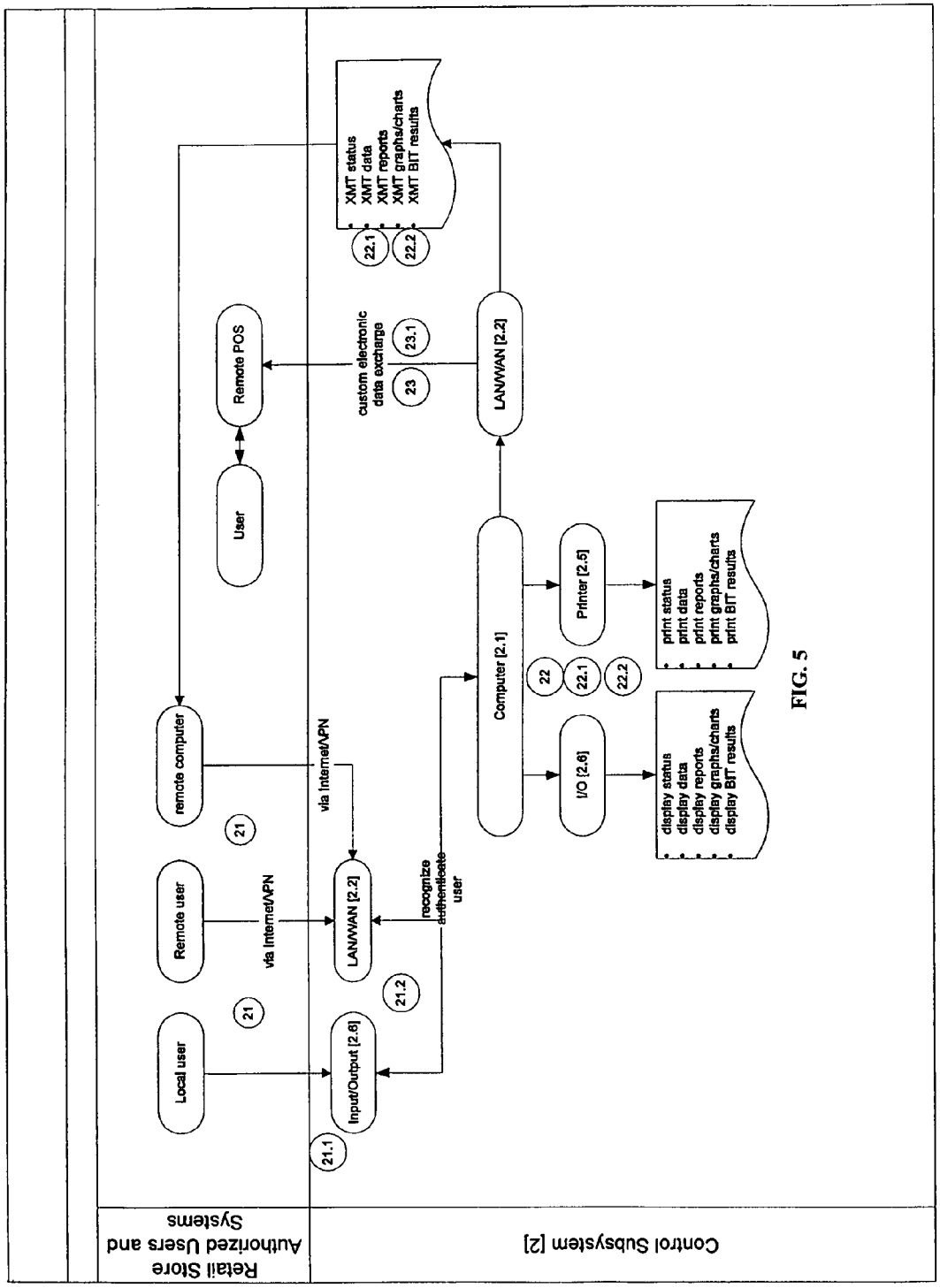
FIG. 5 illustrates an exemplary embodiment of a business workflow implemented using a system of the present invention, highlighting management of system operation.
Figure 6:
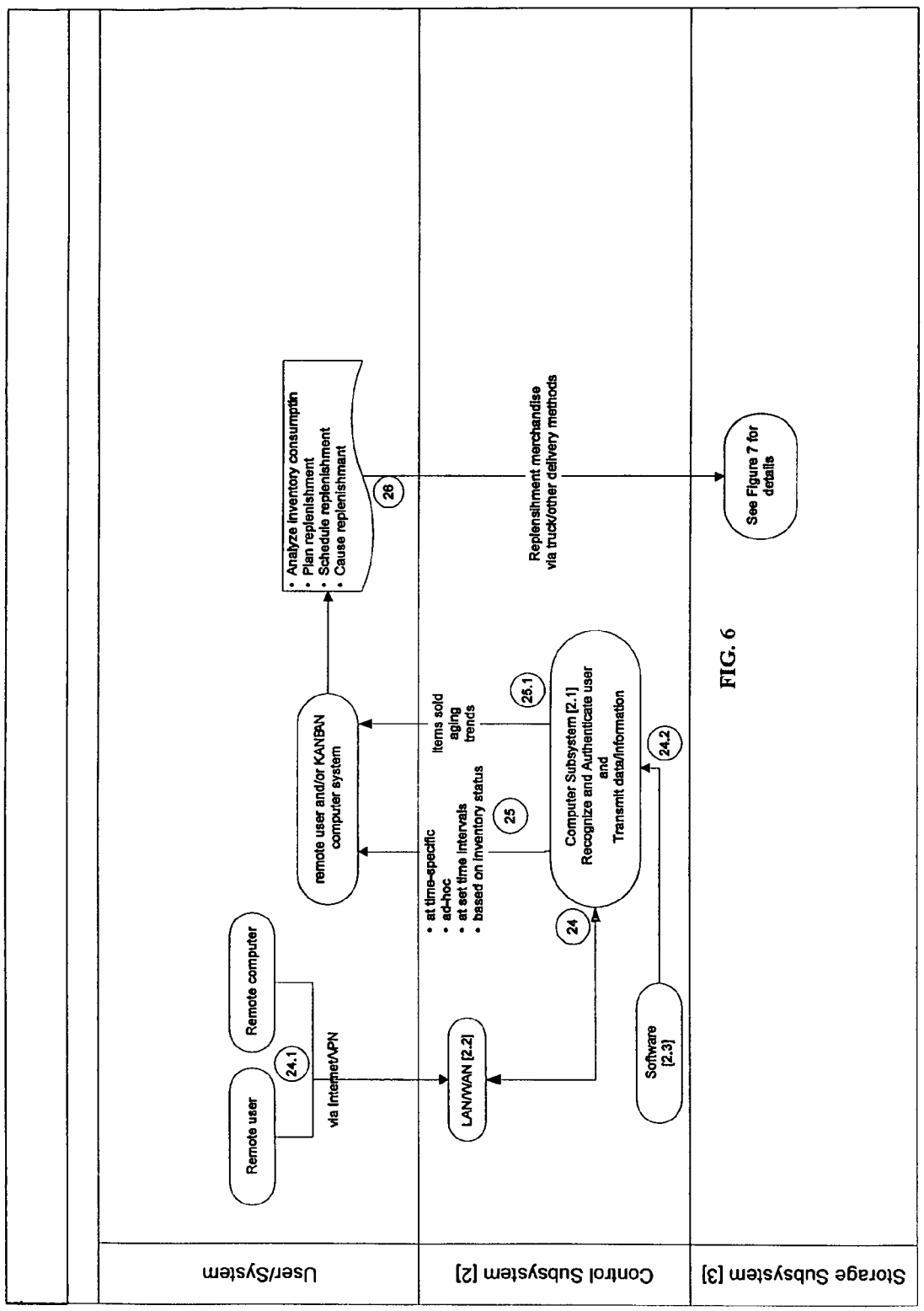
FIG. 6 illustrates an exemplary embodiment of a business workflow implemented using a system of the present invention, highlighting a business method for Kanban inventory replenishment.
Figure 7:
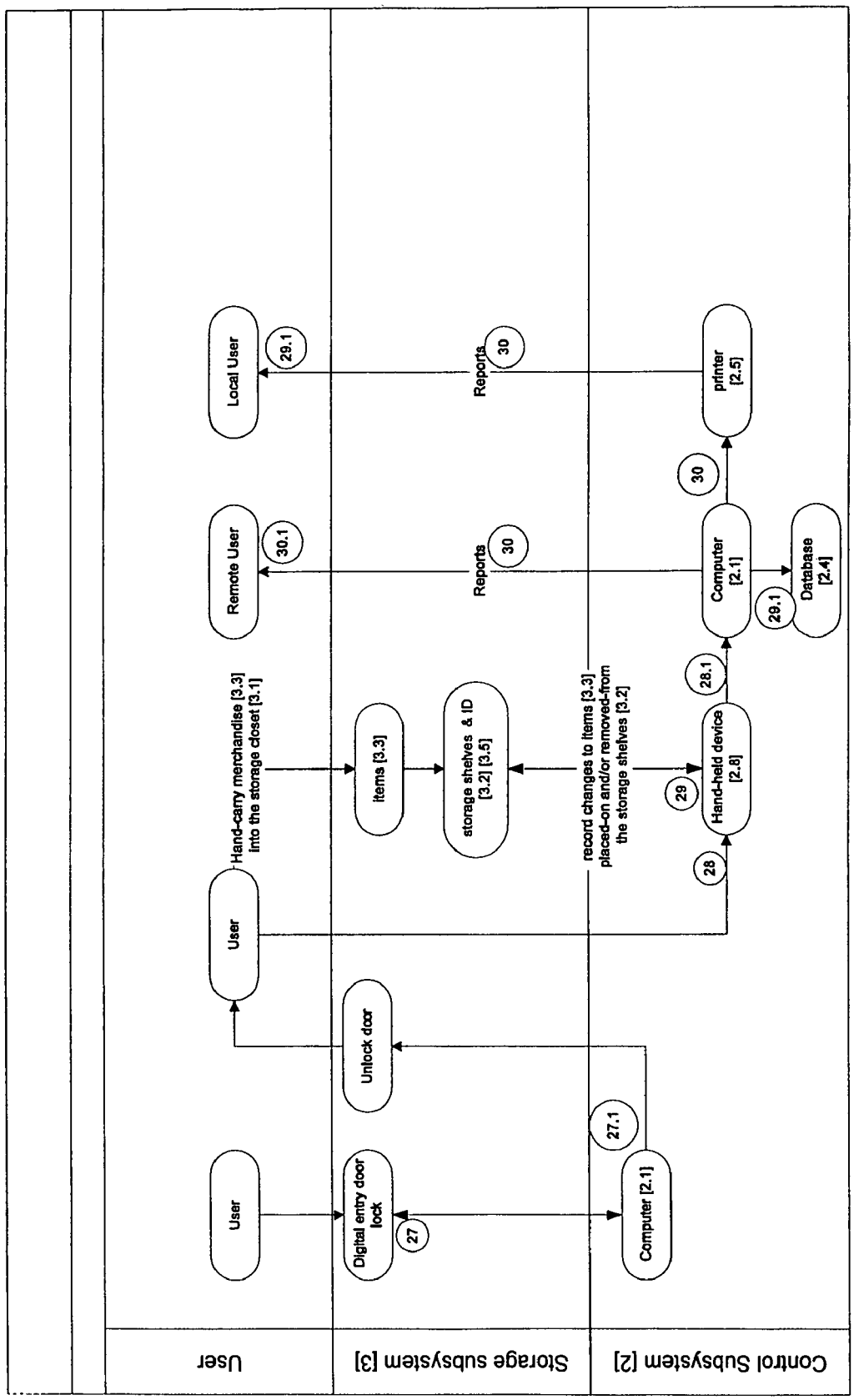
FIG. 7 illustrates an exemplary embodiment of a business workflow implemented using a system of the present invention, highlighting a business method for inventory restocking.
Figure 8:
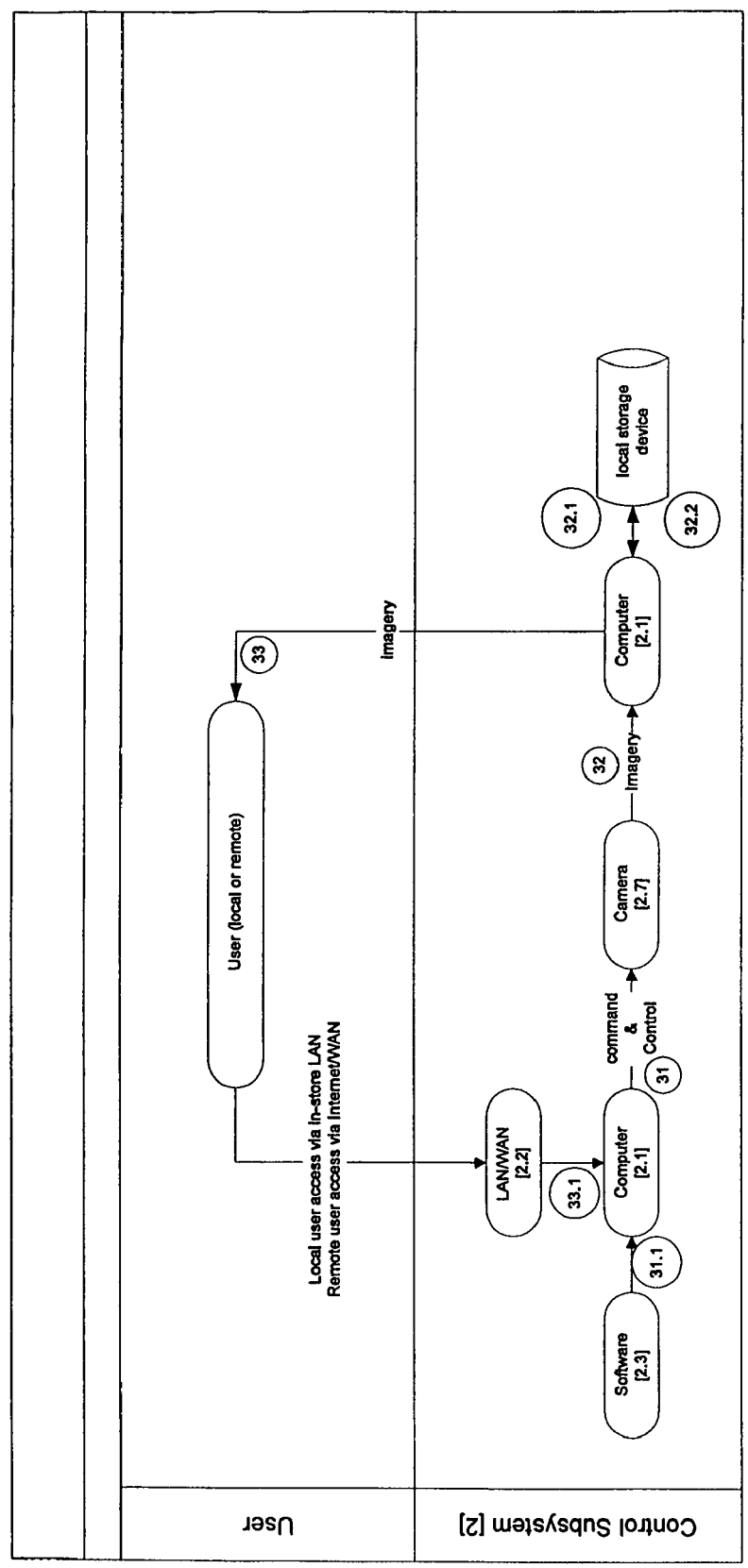
FIG. 8 illustrates an exemplary embodiment of a business workflow implemented using a system of the present invention, highlighting security monitoring through camera operations and monitoring.
Figure 9A:
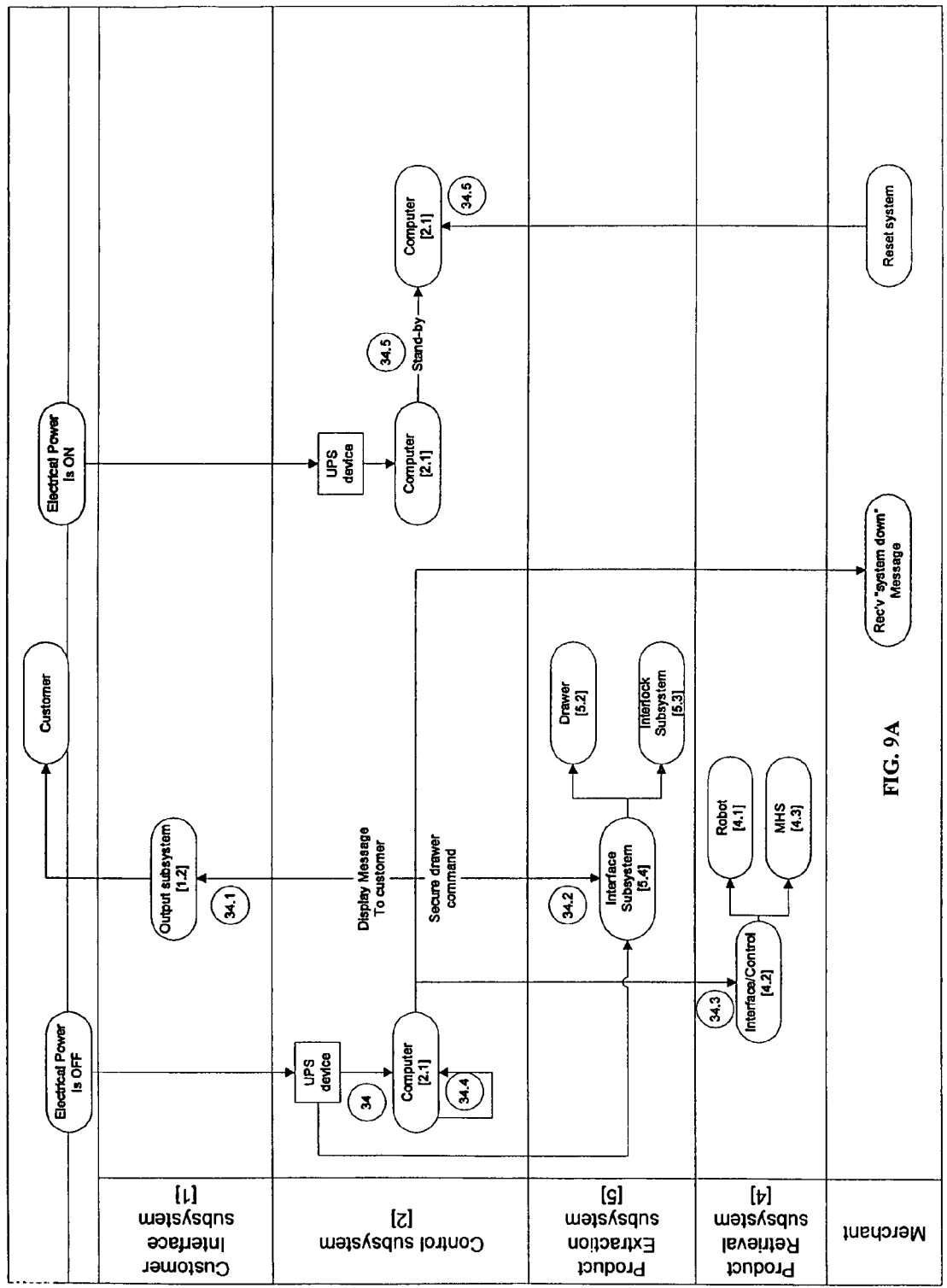
FIG. 9A illustrates the first part of an exemplary embodiment of a business workflow implemented using a system of the present invention, highlighting a business method for Category I error handling.
Figure 9B:
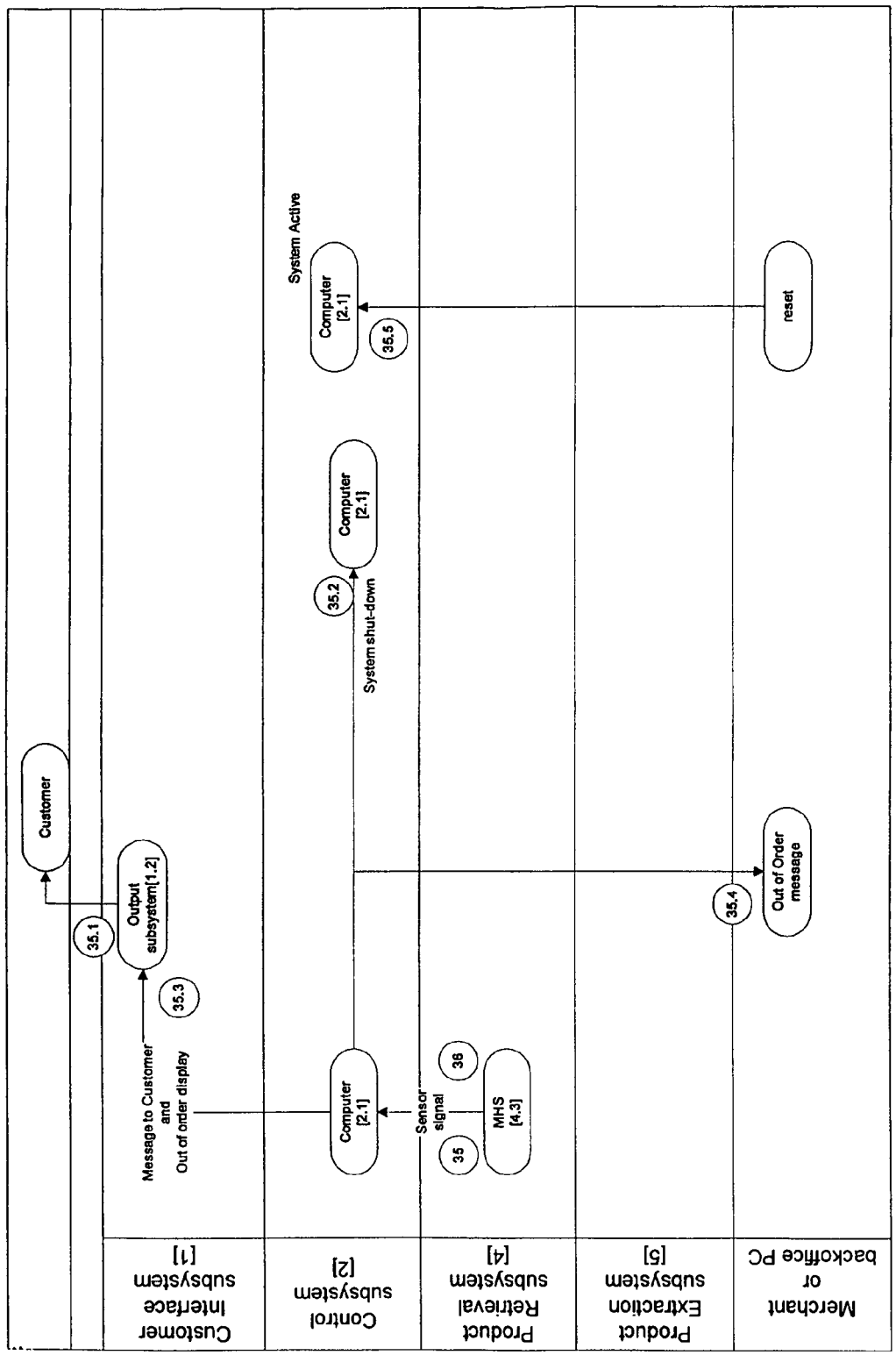
FIG. 9B illustrates the second part of the exemplary embodiment of the business workflow shown in FIG. 9A.
Figure 10:
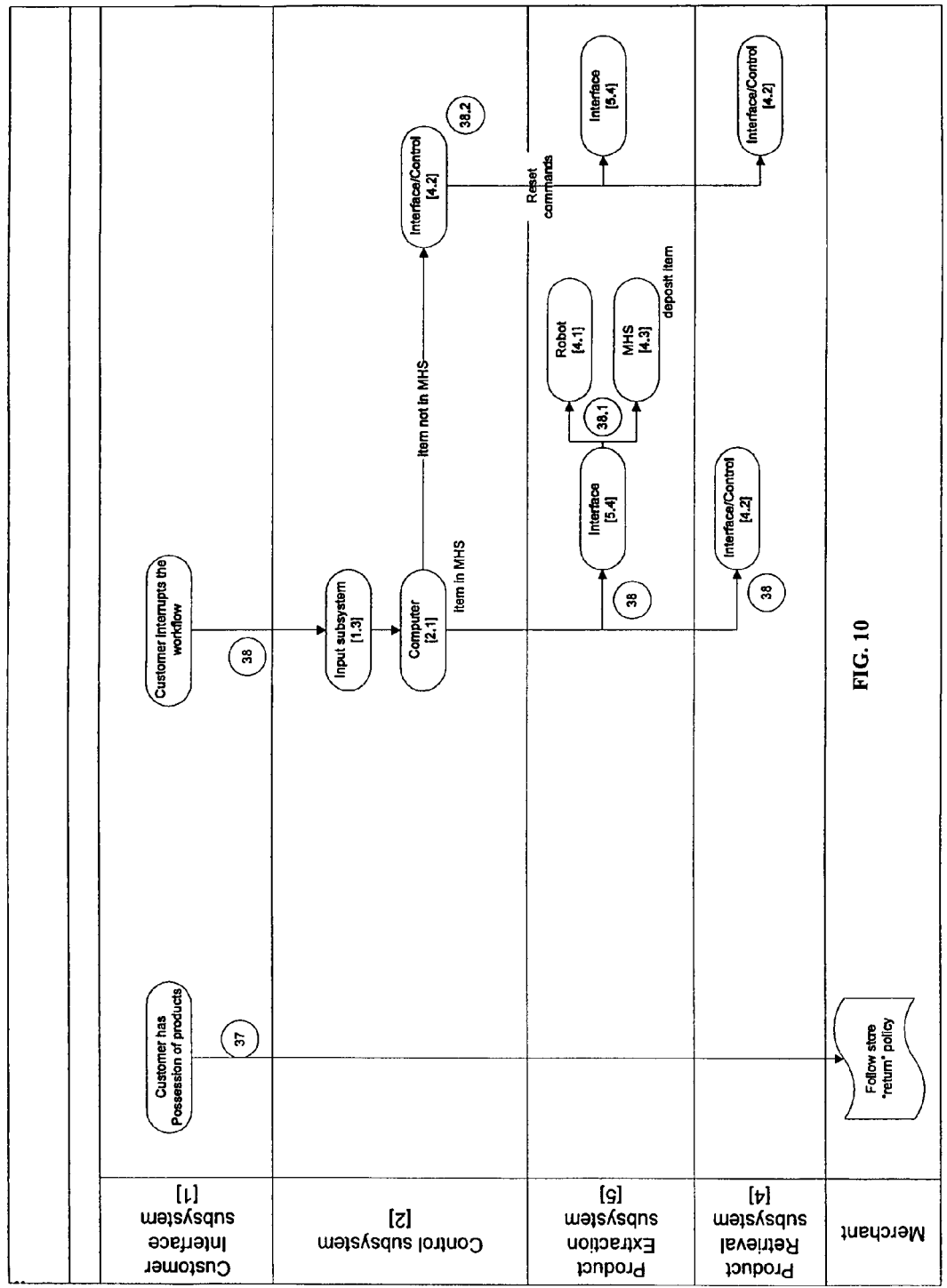
FIG. 10 illustrates an exemplary embodiment of a business workflow implemented using a system of the present invention, highlighting a business method for Category II error handling.

FIGS. 2 through 10 illustrate an exemplary embodiment of an integrated business workflow implemented using a system [100] of the present invention, highlighting multiple integrated business methods, including: retail operations [FIG. 2], self-service purchase [FIGS. 3A and 3B], Internet sale and local pick up of merchandise [FIG. 4], management of the business operations of the system [FIG. 5], Kanban inventory replenishment [FIG. 6], Inventory restocking [FIG. 7], security camera monitoring [FIG. 8], error handling [FIGS. 9A and 9B and FIG. 10]. These exemplary workflows provide retail merchants an economically sound and viable business model by which to offer their customers previously unavailable self-service, 24×7, large-selection, purchasing functionality with convenience.

By way of an example, the term "customer" as used in the context of the present invention refers to any paying user of the system, and may include retail customers, wholesale customers, confined inmates, patients in a medical or rehabilitation institution, and others who are physically and mentally capable of interacting with the Input/Output (I/O) Subsystem [1] either directly or through the Internet. The terms "user", "employee", "operator", "merchant" are used interchangeably in either singular or plural form to mean the same thing and to denote a human operator of the system who is not a customer. The terms "item," "product," and "merchandise" are used interchangeably in either singular or plural form to mean the same thing and to denote a physical item that is available to a customer for purchase through the system [100] of the present invention. An item includes anything that is generally sufficiently small and light in weight to be hand-carried by a person and labeled with identification information, such as bar code, RFID, etc.

Methods

The following methods are included to more clearly demonstrate the overall nature of the invention. These methods are exemplary, not restrictive, of the invention. Specifically, details surrounding a range of exemplary embodiments of complementary business methods and workflows are provided for the following seven examples: Example 1 highlights a self-service retail sale conducted in person; Example 2 highlights a self-service retail sale conducted through the Internet; Example 3 highlights a management of the system and its operation; Example 4 highlights an inventory replenishment using Kanban methods; Example 5 highlights a restocking of merchandise within the system; Example 6 highlights a security monitoring of the interior of the storage closet; and Example 7 highlights error handling and return of merchandise.

EXAMPLE 1

Self-Service Retail Sale Conducted In Person

Reference is made to FIGS. 3A and 3B, which in combination provide an exemplary schematic illustration of a business method, for self-service retail sale conducted in person, implemented using a system [100] of the present invention.

In Step 1 of the method, the customer engages and interacts with the Input/Output (I/O) Subsystem [1] in order to review available product choices and to select/designate products for purchase. In Sub-step 1.1, the input Subsystem [1.3] accepts the customer's inquiry inputs (e.g., via the GUI, touch screen display, keyboard, etc.) and communicates that information to the computer [2.1]. In Sub-step 1.2, the computer [2.1], in response to and in support of the inquiries, causes the database [2.4] to provide pertinent information about available products which, in turn, enables the customer to make a decision on what products to purchase. Examples of pertinent information may include product name, description of product, purchase price, discount information, tax information, image of the product, consumer information fact-sheet, and the like. In Sub-step 1.3, the computer [2.1] communicates the information received from the database [2.4] to the output Subsystem [1.2]. The output Subsystem [1.2] communicates that information to the customer. The term "communicates," in this context, may consist of displayed information, printed information, audio information, and the like.

Based on the information that is given to the customer, the customer then interacts with the input Subsystem [1.3], at Step 2, to indicate their selection of product or products for purchase. At Step 3, the customer's selection is communicated by the Input/Output (I/O) Subsystem [1] to the control Subsystem [2] for processing and order fulfillment.

The order fulfillment of Step 4 consists of the following four sequentially-integrated sets of events, each of which is further described below. The computer [2.1] guides the customer to initiate the financial transaction through which payment for the merchandise is processed. The computer [2.1] causes the product retrieval Subsystem [4] to pick the customer's merchandise and place the merchandise in the product extraction Subsystem [5]. The computer [2.1] causes the drawer [5.2] to open towards the customer and to enable the customer to extract their merchandise. The computer [2.1] causes the system to reset and await the next customer. To provide an illustrative example, each set of events is further described below.

A. Initiating the Financial Transaction

In Step 4, the computer [2.1] initializes the financial transaction Subsystem [1.4]. In Step 5, the computer [2.1] communicates commands to the output Subsystem [1.2] and the output Subsystem [1.2], in turn, communicates to the customer step-wise instructions to initiate a financial transaction using an approved payment method. Examples of an approved payment method include credit card, debit card, smart card, proprietary store-issued card, and/or any other retail-industry-accepted devices and mechanisms which are called generically "card" in the following discussion.

In response to the instructions conveyed to the customer, at Step 6 the customer inserts an approved card into the payment slot contained in the Input/Output (I/O) housing [1.1] to commence the financial transaction process. After the customer inserts their card into the slot, at Sub-step 6.1 the information inferred from the card by the financial transaction Subsystem [1.4] is communicated to the computer [2.1]. The computer [2.1] then establishes, at Sub-step 6.2, an operative communication via the LAN/WAN [2.2] with an external payment authorization service or the retailer's own home office computer. Once the connection has been established, at Sub-step 6.3 the computer [2.1] interacts with the external payment authorization system to determine whether the customer's order will be fulfilled or whether the customer's card will be rejected.

At Sub-step 6.4, the computer [2.1] communicates with the Input/Output (I/O) Subsystem [1] to convey to the customer whether their card has been accepted or rejected. Should the card be rejected, the customer's card is ejected from the card slot and appropriate instructions are provided to the customer via the output Subsystem [1.2]. In contrast, should the card be accepted, appropriate acknowledgement is provided to the customer via the output Subsystem [1.2], and the order fulfillment process continues with the next set of events as described below.

B. Retrieval and Deposit of the Customer's Merchandise

At Step 7 (not shown), which is a combination of Sub-steps 7.1 and 7.2, the computer [2.1] communicates a series of commands to the product retrieval Subsystem [4] that causes the Subsystem to individually locate, pick, and place each product as follows. In Sub-step 7.1, the computer [2.1] queries the database [2.4] on the precise location of each item. Using this information, in Sub-step 7.2 the computer [2.1] communicates to the robot interface/control Subsystem [4.2] the coordinates of the item to be picked.

In Sub-step 7.3, the robot interface/control Subsystem [4.2] causes the robot [4.1] to traverse in three-dimensional space to a point from which the material handling Subsystem [4.3] can reach and grab (pick) the customer's product located on one of the storage shelves [3.2] inside the storage closet [3.1]. Upon arrival at the designated coordinates, in Sub-step 7.4, the robot interface/control Subsystem [4.2] commands the material handling Subsystem [4.3] to maneuver itself to grab (pick) the customer's selected product. At Sub-step 7.5, sensors within the material handling Subsystem [4.3] provide a signal feedback to the robot interface/control Subsystem [4.2] that the material handling Subsystem [4.3] has successfully gained a positive hold of the product. The signal is communicated to the computer [2.1].

Once the computer [2.1] has received the signal, at Sub-step 7.6 the computer [2.1] commands the robot interface/control Subsystem [4.2] to maneuver the robot [4.1] to a pre-defined product-deposit position while simultaneously commanding the product extraction Subsystem [5] to cause the drawer [5.2] to unlock and open into the interior of the storage closet [3.1] and into the product deposit position. The robot interface/control Subsystem [4.2] maneuvers the robot [4.1] in three dimensional space to the designated deposit coordinates at Sub-step 7.7. Upon arrival at the designated coordinates, at Sub-step 7.8 the robot interface/control Subsystem [4.2] awaits further instructions from the computer [2.1]. This will ensure that the material handling Subsystem [4.3] will not release the product before the drawer [5.2] is fully in the open product-deposit position. Upon receipt of a signal from the computer [2.1], at Sub-step 7.9 the robot interface/control Subsystem [4.2] commands the material handling Subsystem [4.3] to release the product in its hold and the product then drops, due to force of gravity, into the open drawer [5.2].

In Step 8 (not shown), the above sequence is repeated sequentially until all the products selected by the customer have been deposited in the drawer [5.2]. It should be noted that the customer may continue to make product selections concurrently, in Sub-step 8.1, while the system [100] is fulfilling the prior order from the same customer provided Sub-step 6.3 above has been completed successfully.

C. Extraction of the Products by the Customer

In Step 9, which is a combination of sub-steps 9.1 and 9.2, upon a determination by the computer [2.1] that all of the products selected by the customer for purchase are in the drawer [5.2], the computer [2.1] commands the product extraction Subsystem [5] to cause the drawer [5.2] to rotate about its hinge axis and open to the exterior of the storage closet [3.1] and into the product extraction position in order for the customer to grab and physically extract the contents within the drawer [5.2]. In Sub-step 9.1, the product extraction Subsystem [5] commands the interlock Subsystem [5.3] to move to the unlock position to enable the drawer [5.2] to rotate about its axis into the exterior of the storage closet [3.1]. In Sub-step 9.2, the product extraction Subsystem [5] commands the drawer [5.2] to rotate about its axis into the appropriate position from which the customer has full access to the interior of the drawer [5.2].

In Step 10, while the product extraction Subsystem [5] is maneuvering the drawer [5.2] to its extraction position, the computer [2.1] simultaneously commands the output Subsystem [1.2] to convey instructions to the customer to remove their products from the drawer [5.2]. The output Subsystem [1.2] communicates these instructions to the customer in Sub-step 10.1. Weight sensors in the product extraction Subsystem [5] provide a signal to indicate that the merchandise has been removed from the drawer [5.2] in Sub-step 10.2.

In Step 11, while the product extraction Subsystem [5] is maneuvering the drawer [5.2] to its extraction position, the computer [2.1] simultaneously commands the financial transaction Subsystem [1.4] to conclude the transaction, to provide the customer with a printed receipt, and to release and eject the customer's card. The Input/Output (I/O) Subsystem [1] provides the customer with a printed receipt and causes the customer's card to be ejected to enable the customer to grab and extract the card from its slot in Sub-step 11.1. Sensors within the card slot transmit a signal that causes the financial transaction Subsystem [1.4] to communicate to the computer [2.1] that the customer's card has been extracted from the slot in Sub-step 11.2.

D. System Reset

In Step 12, upon receipt of both signals from the sensors in the card slot and from the sensors in the product extraction Subsystem [5], the computer [2.1] commands the product extraction Subsystem [5] to return the drawer [5.2] to its neutral position. The product extraction Subsystem [5] commands the drawer [5.2] to rotate about its axis to the neutral position in Sub-step 12.1. The product extraction Subsystem [5] commands the interlock Subsystem [5.3] to move into the locked position and thus prevent unauthorized movement of the drawer [5.2] in Sub-step 12.2.

In Step 13, the computer [2.1] commands the Input/Output (I/O) Subsystem [1] to return to its neutral status. The system [100] is then ready to begin the process again, at Step 14, in support of the next customer.

EXAMPLE 2

Self-Service Retail Sale Conducted Through The Internet

Reference is made to FIG. 4, which is an exemplary schematic illustration of a business method, for Internet sale, implemented using a system [100] of the present invention. An exemplary embodiment of an Internet order fulfillment process consists of the following integrated sets of events. First, the customer makes use of the Internet to place an order. Second, the computer [2.1] causes the product retrieval Subsystem [4] to pick the customer's merchandise and place the merchandise in the temporary holding location [3.4] within the storage closet [3.1]. Third, upon arrival and recognition of the customer, the computer [2.1] causes the product retrieval Subsystem [4] to transfer the customer's merchandise from the temporary location [3.4] to the drawer [5.2] for the customer to extract and remove. Finally, the computer [2.1] causes the system [100] to reset and await the next customer. To provide an illustrative example, each set of events is further described below.

A. Order and Electronic Payment Processing (i.e., E-Commerce)

In Step 15 the customer uses the Internet to log-on to the merchant's web site and, once logged on, the customer is presented with a list from which to select the specific location for merchandise pick up. In Sub-step 15.1, the web site computer queries the computer [2.1], using a secure/encrypted mechanism (e.g., VPN and https://), for current e-catalog information. In Sub-step 15.2, the computer [2.1] communicates back to the web site computer the current e-catalog information for the specific site. In Sub-step 15.3, the customer reviews and designates the product(s) to be picked up at the site of the system [100] within a pre-defined time interval. The time interval is established by the merchant in order to be most consistent with (and most responsive to) the merchant's local market and customer behavior. The time interval may range from zero (i.e., no Internet orders are accepted, only review of what is available for purchase and price information is available via the Internet) to hours. An industry-standard "shopping cart" functionality is included to enable the customer to select, modify, delete and add items to a "shopping cart" for purchase. In Sub-step 15.4, the customer completes the on-line e-commerce financial transactions by which payment is made for the product(s) selected for pick up. In Sub-step 15.5, the web site computer communicates the final shopping cart contents to the computer [2.1].

B. Retrieval and Holding of Customer Merchandise

In Step 16, upon receipt of the final shopping cart information from the web site computer, the items [3.3] that were purchased by the customer are individually picked in a manner similar to that described above (in example 1) and are placed in a designated temporary location [3.4] inside the storage closet [3.1] for rapid processing by the product retrieval Subsystem [4] at a later time. As illustrated in Sub-step 16.1, a temporary storage location [3.4] may consist of a designated storage shelf [3.2], specially configured bin, other suitable container-like structure inside the storage closet [3.1], etc. so sized and configured for optimal performance during the initial storage of the products by the robot [4.1] and during the eventual removal of stored products for deposit in the drawer [5.2] for the benefit of the customer.

C. Customer Extraction of Paid Merchandise

In Step 17, upon arrival at the designated self service autonomous merchandising machine location, the customer will first "identify" themselves to the system [100]. Specifically, at Sub-step 17.1, the customer will initiate the interaction with the input Subsystem [1.3] by inserting into the card slot the same form of payment (e.g., card) they used during their Internet e-commerce transaction. The computer [2.1] validates, at Sub-step 17.2, that an Internet purchase has been performed for this location and using this same card and that the order has not yet been delivered to the customer. Once verified, at Step 18 the computer [2.1] commands the product retrieval Subsystem [4] to transfer the products for this specific order from the temporary holding location [3.4] to the drawer [5.2]. Then, at Step 19, the computer [2.1] commands the product extraction Subsystem [5] to operate, in a manner similar to that described in example 1 above, to enable the customer to extract their merchandise from the drawer [5.2].

For sake of clarity throughout this document, it is assumed that the customer selected a single product for purchase. In instances when a customer selects multiple products, the computer [2.1] will sequentially process the entire pick and deposit sequence until all the products that were purchased have been deposited in the drawer [5.2] or the temporary holding locations [3.4] as described in Step 8 above.

D. System Reset

In Step 20, once the customer has removed their merchandise, the computer [2.1] performs the "reset" tasks described above.

EXAMPLE 3

Management of the System and its Operation

Reference is made to FIG. 5, which is an exemplary schematic illustration of a business method for management of the system [100] and its operation. An exemplary embodiment of management of the system [100] and its operation consists of the following integrated sets of events. First, the status and operation of the system [100] are monitored. Second, the sale of product through the system [100] is monitored. Finally, sales made through the system [100] are consolidated financially with sales made inside the store. To provide an illustrative example, each set of events is further described below.

In Step 21 of the method, the control Subsystem [2] is accessed by an authorized and authenticated user through the I/O Subsystem [2.6]. As illustrated in Sub-step 21.1, the access in the context of the invention may consist of local access by an individual in physical contact with the I/O Subsystem [2.6], by a remote user via the Internet and LAN/WAN Subsystem [2.2] using a private (e.g., VPN/secure/encrypted/ password-protected) mechanism of communication, by a remote computer (e.g., back office computer) using a private (e.g., VPN/secure/encrypted) mechanism of communication, etc. The user, once authenticated by the computer [2.1], is provided in Sub-step 21.2 with functional access commensurate with the user's own profile previously and uniquely established by the merchant for each and every user.

Upon authentication as an authorized user, in Step 22 the computer Subsystem [2.1] through interactive engagement with the user via the I/O Subsystem [2.6] executes commands entered by the user and displays and/or prints textual and/or graphical information with the object of providing the user with a way to obtain current and/or historical data and information pertaining to the system [100]. By form of an example, in Sub-step 22.1 the information may include inventory consumed, delineation of description and quantity of specific items sold, delineation of description, aging, and quantity of specific items remaining in the storage Subsystem, etc. Also by form of an example, in Sub-step 22.2 the information may include initiation of, and subsequent reporting of results of, a built-in-test (BIT) to confirm that the system [100] and its Subsystems are functional within specification, etc.

In Step 23, the user may command the control Subsystem [2] to exchange data through an operative connection with the store's point-of-sale system. It should be noted that the exchange may be initiated by the user, it may be scheduled to occur automatically at pre-defined times (e.g., 2 PM), it may be scheduled to occur at defined time intervals (e.g., every hour on the hour), etc. Based on the functionality of the software programs [2.3], in Sub-step 23.1 the computer [2.1] communicates with the store's point-of-sale system regarding sales information. The sales information may include items sold, items remaining, revenue collected, tax due, etc.

EXAMPLE 4

Inventory Replenishment Using Kanban Methods

Reference is made to FIG. 6, which is an exemplary schematic illustration of a business method, for Kanban inventory replenishment, implemented using a system [100] of the present invention.

Kanban is a recognized lean manufacturing (or just-in-time production) method that is widely implemented to optimize inventory availability. By way of an example, the system [100] includes a geographic region in which several self-service autonomous merchandising machines are installed and supported by a single regional warehouse. The warehouse determines, through the method outlined below, what merchandise has been consumed at each location during the previous period; loads said merchandise onto one or more trucks; and sends the trucks to each location to replenish the inventory. The warehouse, by monitoring historical records across the region, can establish trends, optimize the specific inventory at each location, and otherwise experience economic benefits through this integrated regional Kanban approach. To provide an illustrative example, each set of events is further described below.

In Step 24 of the method, the control Subsystem [2] through its software programs [2.3], I/O Subsystem [2.6], printer [2.5], and LAN/WAN Subsystem [2.2] enables an authorized and authenticated user to query the computer [2.1] in order to obtain a multiplicity of reports, charts, and other information pertinent to inventory status inside the storage closet [3.1]. As illustrated in Sub-step 24.1, the query may be accomplished by a human operator, by another computer system such as the Enterprise Resource Planning (ERP) or Material Requirements Planning (MRP) system, etc. The query and the data obtained though such queries are supported by the software Subsystem [2.3], in Sub-step 24.2, to enable the system [100] operator to implement an effective regional Kanban system with the object of timely and optimal replenishment and/or configuration (i.e., establishing product mix and volumes) of the inventory within the storage Subsystem [3].

In Step 25, the inventory status/consumption data are obtained upon request by an authorized and authenticated user/system, or they may be transmitted by the computer [2.1] at pre-defined time intervals (e.g., every hour) and/or at pre-defined times (e.g., at 5:00 AM). By way of an example, in Sub-step 25.1, the data concerning the inventory may consist of what items sold, how long specific items have been on the shelves, single period and multi-period trends, etc.

In Step 26, the regional warehouse or inventory distribution center obtains and analyzes the data acquired from the computer [2.1] and, based on the analysis, causes appropriate replacement merchandise to be periodically shipped to, and stocked at, individual storage closets [3.1] for the purpose of maintaining the contents of the storage Subsystem [3] at each location at business optimal levels.

EXAMPLE 5

Restocking of Merchandise within the System

Reference is made to FIG. 7, which is an exemplary schematic illustration of a business method, for inventory restocking, implemented using a system [100] of the present invention. Restocking of merchandise is a process wherein an authorized employee is provided with entry into the storage closet Subsystem [3.1] in order to add, restock, remove, rearrange, etc. the items [3.3] located upon the storage shelves [3.2]. By way of an example, entry into the storage closet [3.1] may be via electronic badge or other electronic form or key designed to be tamper proof and to provide a positive record of the individual who gained entry, including the date and time of entry and exit. To provide an illustrative example, each set of events is further described below.

In Step 27 of the method, the employee interacts with the digital lock of the storage closet [3.1] door in order to gain access to the interior of the storage closet [3.1]. Upon authentication by the integrated lock and computer [2.1] system, in Sub-step 27.1, the door is unlocked and entry is made possible. In Step 28, upon entry, the employee uses the hand-held device [2.8] to communicate with the computer [2.1] as individual items [3.3] are added to, removed from, relocated upon, etc. the shelves [3.2]. In Sub-step 28.1, the hand-held device [2.8] employs RF broadband, optical, wired, or similar technologies to establish and maintain an operative link/interface with the computer [2.1] throughout the restocking process.

In Step 29, the hand-held device [2.8] employs technology such as RFID, optical reader, bar code reader, etc. to identify and further communicate to the computer [2.1] the specifics of each item [3.3] as well as each item's precise location on the shelves [3.2] by leveraging the integral on-shelf position location identification [3.5] Subsystem. The computer [2.1] causes the database [2.4] to be updated, in Sub-step 29.1, to reflect the information received from the hand-held device [2.8]. The information, by way of an example, may include SKU number, product name, product bar code, and the like.

In Step 30, the computer [2.1], upon receiving a command to do so by the restocking employee, generates and outputs (e.g., display, printer, file transfer to a back office computer, etc.) a custom report. By way of an example, the report may include the current changes made to the inventory content, a sorted delineation of the inventory content on a specific shelf [3.2] or within the storage closet [3.1], etc. The report may consist of a paper print-out on a printer or a suitably formatted export data file (e.g., CSV format). The request for the output may also be initiated by an authorized and authenticated remote user, as illustrated in Sub-step 30.1, via secure (e.g., VPN) communication with the computer [2.1].

EXAMPLE 6

Security Monitoring of the Interior and Exterior of the Storage Closet

Reference is made to FIG. 8, which is an exemplary schematic illustration of a business method, for camera operations and monitoring, implemented using a system [100] of the present invention. The system [100] may include high-resolution digital cameras strategically positioned within and outside the storage closet Subsystem [3.1]. Each camera Subsystem [2.7] is operatively connected to the computer Subsystem [2.1] and its operation is controlled by the computer Subsystem [2.1]. Access to the controls may be accomplished locally by an authorized employee interacting with the computer Subsystem [2.1] as well as by an authorized remote employee in operative communication with the computer Subsystem [2.1] via the LAN/WAN Subsystem [2.2]. The controls of the camera Subsystem [2.7] may include, for example, pointing, zooming, panning, field of view, field of regard, lighting, etc. The imagery collected by each camera Subsystem [2.7] is stored within the computer Subsystem [2.1] and is available for review, file transfer, and processing by an authorized and authenticated employee.

Observation on a television-like monitor of imagery collected by each camera Subsystem [2.7] by an authorized and authenticated employee may be accomplished by secure operative communication with the computer Subsystem [2.1] via the LAN/WAN Subsystem [2.2]. The communication may include, for example, direct LAN/WAN [2.2], the Internet using a secure VPN, the I/O Subsystem [2.6], etc. To provide an illustrative example, each set of events is further described below.

In Step 31 of the method, the computer Subsystem [2.1] provides for manual or automatic (e.g., unattended) command and control of the camera Subsystem [2.7] including, for example, pointing, zooming, field of view, field of regard, lighting, etc. The command mechanism may include remote command and control by an authorized and authenticated employee of the merchant. As illustrated in Sub-step 31.1, command and control is an integral function of the software Subsystem [2.3].

In Step 32, the camera Subsystem [2.7] captures high-resolution digital imagery and transmits said imagery to the computer Subsystem [2.1] for storage in a specially designated, high-volume, digital imagery storage device. As illustrated in Sub-step 32.1, the storage device may be fixed or portable and may be configured by the merchant to record continuous or time-lapsed frames. As illustrated in Sub-step 32.2, the total volume that may be recorded before an overwrite situation occurs is a variable governed solely by the type and size of the digital imagery storage device installed within the control Subsystem [2].

In Step 33, the computer Subsystem [2.1] allows an authorized and authenticated user to monitor the interior of the storage closet Subsystem [3.1] on demand and in real time or to review recorded imagery or to cause recorded imagery to be transferred from the imagery storage device to a back-office computer for analysis and/or long term archival purposes. As illustrated in Sub-step 33.1, the access by an authorized (i.e., the user is permitted to operate the camera Subsystem) and authenticated (i.e., the individual is who he/she claims to be) user is accomplished by the computer Subsystem [2.1] using a protocol requiring coded user identifications and passwords.

EXAMPLE 7

Error Handling

The business method "Error Handling" encompasses a range of events controlled by the computer [2.1] and designed to prosecute a wide range of unexpected conditions. By way of an example, the conditions may be triggered by: (a) customer claims that the product received is not the product ordered, (b) customer claims that they requested the wrong product after it has been deposited in the drawer [5.2], (c) customer claims that the product ordered and paid for was not received, (d) the machine becomes inoperative while interacting with a customer, (e) the machine cannot satisfy a customer's product selection, and (f) other occurrences.

Because the set of unexpected conditions may be extremely large and diverse, it is helpful to group them into two categories. Category I includes a customer's request for a product that cannot be fulfilled, regardless of reason. Category II includes situations where a product delivered to the customer is not acceptable to the customer, regardless of reason.

By way of an example, a business method for handling each category is described below.

A. Category I—the Customer's Request for Product Cannot be Fulfilled

This category of unexpected conditions may be triggered by such circumstances as a power failure in the midst of system operations; an error in the database indicating that a product is available, but in fact the material handling Subsystem [4.3] cannot achieve positive "pick"; the material handling Subsystem [4.3] drops a product prior to it being deposited into the drawer [5.2]; and the like.

Reference is made to FIGS. 9A an 9B, which in combination provide an exemplary schematic illustration of a business method, for Category I error handling, using a system [100] of the present invention. In Step 34 of the method, the control Subsystem [2] is provided with an Uninterrupted Power Supply (UPS). The UPS is sized to provide the complete system [100] with sufficient power to complete the following actions upon unexpected power failure. The system [100] can output an appropriate message, in Sub-step 34.1, to the customer via the output Subsystem [1.2]; return the drawer [5.2], in Sub-step 34.2, to its closed and locked position; operate the product retrieval Subsystem [4], in Sub-step 34.3, to ensure that any item already held by the material handling Subsystem [4.3] is safely deposited into a pre-determined location within the storage closet [3.1]; and cause the computer [2.1], in Sub-step 34.4, to store current data for retrieval once normal electrical power has been re-established. Upon establishment of normal electrical power, in Sub-step 34.5, the system [100] will remain inoperative until an authorized and authenticated user has inspected and re-set the system [100].

Should the material handling Subsystem [4.3] not be able to report to the computer [2.1] that it has in fact picked the item that it was commanded to pick, in Step 35 of the method the computer [2.1] will initiate the following actions: output an appropriate message to the customer via the output Subsystem [1.2] in Sub-step 35.1; command the system [100] to undergo a set of prescribed commands, the end result of which is a controlled system shut down in Sub-step 35.2; cause an "Out of Order" message to be continuously displayed on the output Subsystem [1.2] in Sub-step 35.3; and cause an "Out of Order" message with supporting data to be transmitted to the back office computer in Sub-step 35.4. In Sub-step 35.5, the system will remain off-line until reset by an authorized and authenticated employee. The reset may be accomplished locally or remotely.

Should the material handling Subsystem [4.3] report to the computer [2.1] that an item in its gripper is no longer in the gripper and the report is received prior to the expected deposit of the item in the drawer [5.2], in Step 36 the computer [2.1] will initiate the following actions: output an appropriate message to the customer via the output Subsystem [1.2] in Sub-step 35.1; command the system [100] to undergo a set of prescribed commands, the end result of which is a controlled system shut down in Sub-step 35.2; cause an "Out of Order" message to be continuously displayed on the output Subsystem [1.2] in Sub-step 35.3; and cause an "Out of Order" message with supporting data to be transmitted to the back office computer in Sub-step 35.4. In Sub-step 35.5, the system [100] will remain off-line until reset by an authorized and authenticated employee. The reset will be accomplished locally and upon physical inspection of the material handling Subsystem [4.3].

B. Category II—The Product Delivered is Unacceptable to the Customer

This category of unexpected conditions may be triggered by such circumstances as: (a) the customer, upon inspection of the item extracted from the drawer [5.2], determines the item is not what was ordered or needed; or (b) before the opening of the drawer [5.2], the customer either cancels the operation or indicates to the computer [2.1] that the order needs to be changed.

Reference is made to FIG. 10, which is an exemplary schematic illustration of a business method, for Category II error handling, using a system [100] of the present invention. In the case when the customer has taken possession of the product, in Step 37 of the method the customer must follow the merchant's existing policy on returns. This policy may require the customer to return the product to the merchant for credit or replacement during normal working hours. Under these circumstances, the merchant's standing credit or refund policy will apply.

In the case when the customer interrupts the work flow at any time before the opening of the drawer [5.2] and regardless of the reason (e.g., order cancelled, wrong product was ordered, etc.), in Step 38 of the method, the computer [2.1], upon receiving the customer's interrupt input via the input Subsystem [1.2], causes all movements of the product retrieval Subsystem [4] and the product extraction Subsystem [5] to stop. Should an item [3.3] be held by the material handling Subsystem [4.3], in Sub-step 38.1 the computer [2.1] will cause the product retrieval Subsystem [4] to deposit the item [3.3] in a specific location within the storage closet [3.1] for inspection and restocking by the merchant. Once completed, the computer [2.1] will reset the system [100] as outlined above. Should the material handling Subsystem [4.3] be without an item [3.3], in Sub-step 38.2 the computer [2.1] will process a set of system reset instructions and execute them as described above.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. More specifically, although the system contemplates handling retail products such as over-the-counter medication, first aid, sundries, personal hygiene, and the like, the list of retail products is meant solely as an example and shall not be construed to represent an exhaustive list of all items and products for which this invention is directly applicable.

What is claimed:

1. A method for un-attended, autonomous, and automatic dispensing of retail products, the method comprising the steps of:
    (a) interacting with a machine defining a system having an input/output (I/O) subsystem, a control subsystem having and being based upon a computer, a specially configured storage subsystem, a pick-and-place robotic-based product retrieval subsystem, and a product extraction subsystem;
    (b) enabling self-service retail sale;
    (c) permitting Internet sale with local product pick-up;
    (d) managing the business operations of the system;
    (e) replenishing inventory by processing sales information via software programs contained within the computer and creating and transmitting upon request or at predefined time intervals or at predefined scheduled times data concerning the inventory contained inside the storage subsystem, and providing the data concerning the inventory contained inside the storage subsystem to a regional inventory distribution center, which then analyses the data and, based on the data, causes replacement products to be periodically shipped to and stocked within the storage subsystem, thereby maintaining the contents of the storage subsystem at optimal levels;
    (f) restocking inventory;
    (g) operating and monitoring a security camera;
    (h) handling error arising when a customer's request for a product cannot be fulfilled; and
    (i) handling error arising when a product delivered to the customer is not acceptable to the customer.

2. The method of claim 1, wherein a customer engages the I/O subsystem to review, select, and designate one or more products to be purchased.

3. The method of claim 2, wherein an input subsystem of the I/O subsystem communicates with the computer to cause a database to present to the customer on an output subsystem pertinent information to enable the customer to use the input subsystem to select specific products available in a storage closet for purchase.

4. The method of claim 3, wherein the customer uses the input subsystem to indicate their selection of product or products for purchase and the selection is then transmitted by the I/O subsystem to the control subsystem.

5. The method of claim 4, wherein the computer, using software, establishes and transmits commands to the output subsystem and the output subsystem displays to the customer step-wise instructions to initiate a financial transaction using an approved payment method through a financial transaction subsystem.

6. The method of claim 5, wherein the customer inserts an approved form of payment into a slot contained in the financial transaction subsystem to commence the financial transaction.

7. The method of claim 6, wherein the form of payment is processed by the computer in operative communication via a LAN/WAN subsystem with an external payment authorization service or a retailer's own home office computer.

8. The method of claim 7, wherein the customer is informed via the LAN/WAN subsystem through the output subsystem whether the form of payment has been rejected or accepted.

9. The method of claim 8, wherein upon rejection of the form of payment, the customer's form of payment is ejected from the slot and appropriate instructions are displayed on the output subsystem.

10. The method of claim 8, wherein upon acceptance of the form of payment, a message, including the identification of the specific products the customer selected, is communicated via an interface subsystem to the computer for further processing.

11. The method of claim 10, wherein, after the message is communicated, the control subsystem, using the software contained in the control subsystem, provides instructions to a robot interface/control subsystem of the product retrieval subsystem concerning the precise location of the selected product.

12. The method of claim 11, wherein (i) the robot interface/control subsystem causes a robot to traverse in three-dimensional space to a point from which the material handling subsystem of the product retrieval subsystem can reach and grab the selected product.

13. The method of claim 12, wherein (ii) the material handling subsystem grabs the selected product.

14. The method of claim 13, wherein (iii) the material handling subsystem provides a signal feedback to the computer via the robot interface/control subsystem that it successfully grabbed the selected product.

15. The method of claim 14, wherein (iv) the computer commands the robot interface/control subsystem to maneuver the robot to a pre-defined product-deposit position and simultaneously commands the product extraction subsystem to cause a drawer of the product extraction subsystem to unlock and open into a product deposit position.

16. The method of claim 15, wherein (v) the robot interface/control subsystem causes the robot to maneuver in three-dimensional space to a designated deposit position.

17. The method of claim 16, wherein (vi) upon receipt by the computer of a signal indicating the robot has arrived at the designated deposit position, the computer signals the product retrieval subsystem to cause the material handling subsystem to release the product thus causing the product to be deposited into the drawer.

18. The method of claim 17, wherein (vii) the product retrieval subsystem complies with the computer command and causes the product held by the material handling subsystem to be released and, due to the force of gravity, fall into the drawer.

19. The method of claim 18, wherein the steps (i), (ii), (iii), (iv), (v), (vi), and (vii) are sequentially repeated until all the products selected by the customer for purchase have been deposited into the drawer.

20. The method of claim 1, wherein, upon determination that all of a customer's selected products have been properly deposited in a drawer of the product extraction subsystem, the computer sends a signal to the product extraction subsystem causing the drawer to rotate about a hinge axis and open into a product extraction position in order to enable the customer to grab and physically remove the contents within the drawer and wherein the product extraction subsystem causes the drawer to open towards the customer and into the product extraction position.

21. The method of claim 20, wherein the computer commands an output subsystem of the I/O subsystem to display instructions to the customer to remove their products from the drawer.

22. The method of claim 21, wherein the computer commands a financial transaction subsystem of the I/O subsystem to conclude the transaction and to provide the customer with a printed receipt and to release and eject a card of the customer from a card slot contained in the financial transaction subsystem, and wherein the I/O subsystem provides the customer with a printed receipt and causes the card to be ejected to enable the customer to grab and extract the card from the card slot.

23. The method of claim 22, wherein, after the customer removes their card from the card slot, the I/O subsystem sends a signal to the computer and, upon receipt of the signal, the computer commands the product extraction subsystem to cause the drawer to rotate about its hinge axis into an interior and locked position.

24. The method of claim 1, wherein the machine permits a retail merchant or machine operator to complete one or more of (a) monitoring the status and operations of the machine, (b) monitoring the consumption of inventoried products transferred through the machine, and (c) financially consolidating sales made through the machine with sales made within a store using the store's point-of-sale system.

25. The method of claim 24, wherein the control subsystem is accessed directly by an authorized and authenticated user while inside a storage closet of the storage subsystem through an I/O subsystem of the control subsystem, or indirectly by an authorized and authenticated user via the Internet and a LAN/WAN subsystem of the control subsystem using a private, secure, encrypted, password-protected communication for the purpose of obtaining system status, a multiplicity of reports, details concerning products remaining or sold, and other relevant business information.

26. The method of claim 25, wherein the control subsystem has software and a printer and uses both its software and interactive engagement with the user via the I/O subsystem of the control subsystem and the printer to execute commands entered by the user and to display or print information for the user.

27. The method of claim 25, wherein the control subsystem exchanges data through an operative connection with a point-of-sale system of a store either upon command of an authorized and authenticated user or as scheduled to occur automatically at pre-defined times or time intervals.

28. The method of claim 27, wherein the computer communicates with a local point-of-sale system via an operative connection through the LAN/WAN subsystem.

29. The method of claim 27, wherein the computer communicates with a remote back-office computer via an operative connection through the LAN/WAN subsystem and an Internet gateway using a secure and encrypted virtual private network.

30. The method of claim 1, wherein a customer indirectly accesses the control subsystem via an Internet web site of a merchant and a LAN/WAN subsystem using a secure or encrypted mechanism in order to place an order for pick-up.

31. The method of claim 30, wherein the customer accesses the Internet web site for the purpose of transacting product selection, purchase, and payment using e-catalog and e-commerce methods.

32. The method of claim 30, wherein a server of the Internet web site communicates product information and credit card identification information with the computer.

33. The method of claim 32, wherein the products purchased by the customer are individually picked and placed in a designated temporary storage location inside a storage closet of the storage subsystem for rapid processing by the retrieval subsystem at a later time.

34. The method of claim 33, wherein the temporary storage location is one of a storage shelf, a specially configured and set-aside bin, or another structure inside the storage closet configured for optimal performance during (a) the initial storage of the products and (b) the storage of multiple products and (c) the eventual removal of products for deposit in a drawer of the product extraction subsystem for the benefit of the customer.

35. The method of claim 30, wherein the customer upon arrival at a designated location of the machine inserts a form of payment into a slot in an input subsystem of the I/O subsystem.

36. The method of claim 35, wherein the computer validates and authenticates by comparing the payment form inserted into the slot with information made available to the computer through communication of product information and credit card identification information between a server of the Internet web site and the computer.

37. The method of claim 36, wherein upon positive identification of the customer, the computer commands the retrieval subsystem to transfer the customer's products from a temporary location to a drawer of the product extraction subsystem.

38. The method of claim 37, wherein upon completion of the transfer of all of the customer's products to the drawer, the computer causes the drawer to open and permit the customer to remove their products.

* * * * *